(12) United States Patent
Fukuchi et al.

(10) Patent No.: US 11,836,408 B2
(45) Date of Patent: Dec. 5, 2023

(54) PRODUCTION METHOD, PRODUCTION SYSTEM AND PRODUCTION PROGRAM

(71) Applicant: SEIKO EPSON CORPORATION, Tokyo (JP)

(72) Inventors: Yuto Fukuchi, Nagano (JP); Yasuo Koyauchi, Nagano (JP); Yuka Kobayashi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/820,575

(22) Filed: Aug. 18, 2022

(65) Prior Publication Data
US 2023/0054428 A1 Feb. 23, 2023

(30) Foreign Application Priority Data
Aug. 20, 2021 (JP) .................... 2021-134780

(51) Int. Cl.
*G06F 21/57* (2013.01)
*G06F 3/12* (2006.01)

(52) U.S. Cl.
CPC .......... *G06F 3/1263* (2013.01); *G06F 3/1204* (2013.01); *G06F 3/1267* (2013.01)

(58) Field of Classification Search
None
See application file for complete search history.

(56) References Cited

U.S. PATENT DOCUMENTS

| | | | |
|---|---|---|---|
| 9,449,018 B1 * | 9/2016 | Ma | G06F 16/182 |
| 10,754,706 B1 * | 8/2020 | Mo | G06F 9/5038 |
| 11,567,716 B2 | 1/2023 | Kawasaki et al. | |
| 2003/0076525 A1 | 4/2003 | Hikawa | |
| 2010/0290080 A1 | 11/2010 | Klassen | |
| 2014/0355031 A1 | 12/2014 | Fukuda | |
| 2014/0368866 A1 | 12/2014 | Kikumoto | |
| 2015/0138596 A1 | 5/2015 | Kikuchi | |
| 2016/0292543 A1 | 10/2016 | Oishi | |
| 2018/0097950 A1 | 4/2018 | Sagata | |
| 2020/0278819 A1 | 9/2020 | Yamasaki | |
| 2020/0293239 A1 * | 9/2020 | Kawasaki | G06F 3/1265 |
| 2020/0301638 A1 | 9/2020 | Fukui | |
| 2020/0406643 A1 | 12/2020 | Komazawa et al. | |
| 2021/0019097 A1 | 1/2021 | Sawata et al. | |
| 2021/0286571 A1 | 9/2021 | Betsuyaku et al. | |
| 2021/0294548 A1 | 9/2021 | Kawasaki et al. | |
| 2022/0011736 A1 | 1/2022 | Ishimura | |
| 2022/0035589 A1 | 2/2022 | Sawata | |
| 2022/0156018 A1 | 5/2022 | Matsui | |
| 2023/0029198 A1 | 1/2023 | Guevin et al. | |
| 2023/0058455 A1 | 2/2023 | Fukuchi et al. | |

FOREIGN PATENT DOCUMENTS

JP 2020-155118 A 9/2020

* cited by examiner

*Primary Examiner* — Frantz Bataille
(74) *Attorney, Agent, or Firm* — Global IP Counselors, LLP

(57) ABSTRACT

Provided is a production method including a reception step of receiving a plurality of matters and deadlines corresponding to the matters, a display step of displaying a list of the received matters, a plurality of processes corresponding to the matters, and the deadlines, and a production step of producing a finished product by executing processing that includes the plurality of processes corresponding to the received matters.

6 Claims, 12 Drawing Sheets

FIG. 5

PROCESS MANAGEMENT  GROUP MANAGEMENT  DEVICE MONITORING

| GROUP NAME | |
|---|---|
| GROUP 1 | ~B₁ |
| ORDER NUMBER | |
| 0001 | ~B₂ |
| REQUESTER NAME | |
| REQUESTER 1 | ~B₃ |

| PRIORITY LEVEL | | DELIVERY DATE | | | |
|---|---|---|---|---|---|
| HIGH ▼ | ~B₄ | 5/30/2021 | ~B₅ | | |
| MATTER NAME | ~B₆ | MEDIUM NAME | ~B₇ | NUMBER OF DELIVERIES | ~B₈ | TREATMENT DESIGN | ~B₉ |
| MATTER 1 | | MEDIUM 1 | | 1500 | | PRESET 1 ▼ | |

I₁

| PROCESS OVERVIEW | WAITING FOR SUBMISSION | PRINT SETTING | PRINTING | SURFACE TREATMENT | PACKING | ~B₁₀ |
|---|---|---|---|---|---|---|
| PROCESS DETAILS | | | | LAMINATING | | |
| MAN-HOURS | | | 3 DAYS | 2 DAYS | 1 DAY | |
| WORKER | | WORKER A | WORKER A | WORKER B | | |

| MATTER NAME | ~B₆ | MEDIUM NAME | ~B₇ | NUMBER OF DELIVERIES | ~B₈ | TREATMENT DESIGN | ~B₉ |
| MATTER 2 | | MEDIUM 1 | | 100 | | PRESET 2 ▼ | |

I₁

| PROCESS OVERVIEW | WAITING FOR SUBMISSION | PRINT SETTING | PRINTING | PACKING | ~B₁₀ |
|---|---|---|---|---|---|
| PROCESS DETAILS | | | | | |
| LAMINATING | | | 1 DAY | 1 DAY | |
| WORKER | | WORKER C | WORKER C | WORKER B | |

Ba~ ADD

FIG. 6

| | WAITING FOR SUBMISSION | PRINT SETTING | PRINTING | SURFACE TREATMENT | PACKING |
|---|---|---|---|---|---|
| \> PRIORITY LEVEL: HIGH  DELIVERY DATE: 5/30/2021  GROUP 1 | | | | 5 DAYS BEFORE DELIVERY DATE | |
| MATTER 1 | ⓐ | SETTING | ● ⓟ 1500 | ○ 5/27 ⚠ | ○ 5/30 |
| MATTER 2 | ⓔ | ● ⓠ 100  5/28 | ○ ⓟ  5/29 | | ○ 5/30 |
| \> PRIORITY LEVEL: LOW  DELIVERY DATE: 6/5/2021  GROUP 2 | | | | 11 DAYS BEFORE DELIVERY DATE | |
| MATTER 3 | | SETTING | | | ● ⓠ 15 |
| MATTER 4 | ⓔ | SETTING | ● ⓔ 500 | ○ 6/4 | ○ 6/5 |
| MATTER 5 | | SETTING | | ● 500  6/4 | ○ 6/5 |

FIG. 10

| PROCESS MANAGEMENT | | |
|---|---|---|
| GROUP MANAGEMENT | DEVICE MONITORING | |

GROUP NAME — B₁
GROUP 1

ORDER NUMBER — B₂
0001

REQUESTER NAME — B₃
REQUESTER 1

DELIVERY DATE — B₅
5/30/2021

PRIORITY LEVEL — B₄
HIGH ▼

MATTER NAME — B₆
MATTER 1

NUMBER OF DELIVERIES — B₈
1500

MATTER NAME — B₆
MATTER 2

NUMBER OF DELIVERIES — B₈
50

ADD — Ba

FIG. 11

PROCESS MANAGEMENT
GROUP MANAGEMENT   DEVICE MONITORING

| | WAITING FOR SETTING | WAITING FOR PRINTING | PRINTING | PRINTED |
|---|---|---|---|---|
| ∨ PRIORITY LEVEL: HIGH   DELIVERY DATE: 5/30/2021   GROUP 1 | | | | |
| MATTER 1 | ⬬ SETTING — B23 | | ● 1500 — L2, Bf | |
| MATTER 2 | ⬬ SETTING | ● 50 | | |
| ∨ PRIORITY LEVEL: LOW   DELIVERY DATE: 6/5/2021   GROUP 2 | | | | |
| MATTER 3 | ⬬ SETTING | | | ● 15 |
| MATTER 4 | ● 500  ⬬ SETTING | | | |
| MATTER 5 | ⬬ SETTING | | | ● 500 |

FIG. 12

PROCESS MANAGEMENT
GROUP MANAGEMENT   DEVICE MONITORING
PRINTING DEVICE   SURFACE TREATMENT MACHINE   CUTTING MACHINE

F1:
| PRINTING DEVICE 1 | | NUMBER OF MATTERS 3 |
|---|---|---|
| HIGH | MATTER 1 | 1500 |
| | MATTER 6 | 300 |
| | MATTER 4 | 500 |

F2:
| PRINTING DEVICE 2 | | NUMBER OF MATTERS 3 |
|---|---|---|
| HIGH | MATTER 2 | 50 |
| | MATTER 8 | 50 |
| | MATTER 7 | 100 |

F3:
| PRINTING DEVICE 3 | | NUMBER OF MATTERS 2 |
|---|---|---|
| HIGH | MATTER 11 | 300 |
| | MATTER 10 | 400 |
| | | |

F4:
| PRINTING DEVICE 4 | | NUMBER OF MATTERS 3 |
|---|---|---|
| | MATTER 19 | 500 |
| | MATTER 9 | 1000 |
| | MATTER 13 | 500 |

F5:
| PRINTING DEVICE 5 | | NUMBER OF MATTERS 3 |
|---|---|---|
| | MATTER 14 | 100 |
| | MATTER 12 | 150 |
| | MATTER 16 | 150 |

F6:
| PRINTING DEVICE 6 | | NUMBER OF MATTERS 3 |
|---|---|---|
| HIGH | MATTER 15 | 200 |
| | MATTER 17 | 500 |
| | MATTER 18 | 50 |

PRODUCTION METHOD, PRODUCTION SYSTEM AND PRODUCTION PROGRAM

The present application is based on, and claims priority from JP Application Serial Number 2021-134780, filed Aug. 20, 2021, the disclosure of which is hereby incorporated by reference herein in its entirety.

BACKGROUND

1. Technical Field

The present disclosure relates to a production method, a production system, and a production program.

2. Related Art

In the related art, a process management technique used when a finished product is produced through a plurality of processes is known. For example, JP-A-2020-155118 discloses a system in which a finished product, which is bound by performing printing or cutting processes based on a file indicating a submitted document, is produced.

There is a desire to further improve a process management over the above-mentioned technique in the related art.

SUMMARY

A production method for solving the above problems includes: a reception step of receiving a plurality of matters and deadlines corresponding to the matters; a display step of displaying a list of the received matters, a plurality of processes corresponding to the matters, and the deadlines; and a production step of producing a finished product by executing processing that includes the plurality of processes corresponding to the received matters.

A production system for solving the above problems includes: a reception portion receiving a plurality of matters and deadlines corresponding to the matters; a display portion displaying a list of the received matters, a plurality of processes corresponding to the matters, and the deadlines; and a production portion producing a finished product by executing processing that includes the plurality of processes corresponding to the received matters.

A non-transitory computer-readable storage medium storing a production program for solving the above problems for causing a computer to function as: a reception portion receiving a plurality of matters and deadlines corresponding to the matters; a display portion displaying a list of the received matters, a plurality of processes corresponding to the matters, and the deadlines; and a production portion producing a finished product by executing processing that includes the plurality of processes corresponding to the received matters.

BRIEF DESCRIPTION OF THE DRAWINGS

FIG. 5 is a diagram illustrating an example of a reception screen.

FIG. 6 is a diagram illustrating an example of a group management screen.

FIG. 10 is a diagram illustrating an example of a reception screen.

FIG. 11 is a diagram illustrating an example of a group management screen.

FIG. 12 is a diagram illustrating an example of a device monitoring screen.

DESCRIPTION OF EXEMPLARY EMBODIMENTS

Embodiments of the present disclosure will be described in the following order.
1. System Configuration:
1-1. Configuration of Server:
1-2. Configuration of Administrator Terminal:
1-3. Configuration of Printing Device:
1-4. Configurations of Output device, Surface Treatment Machine, and Barcode Reader:
2. Process Management:
2-1. List Display:
2-2. Device Monitoring Screen:
3. Process Management Processing:
4. Other Embodiments:

1. System Configuration

Figure 1:
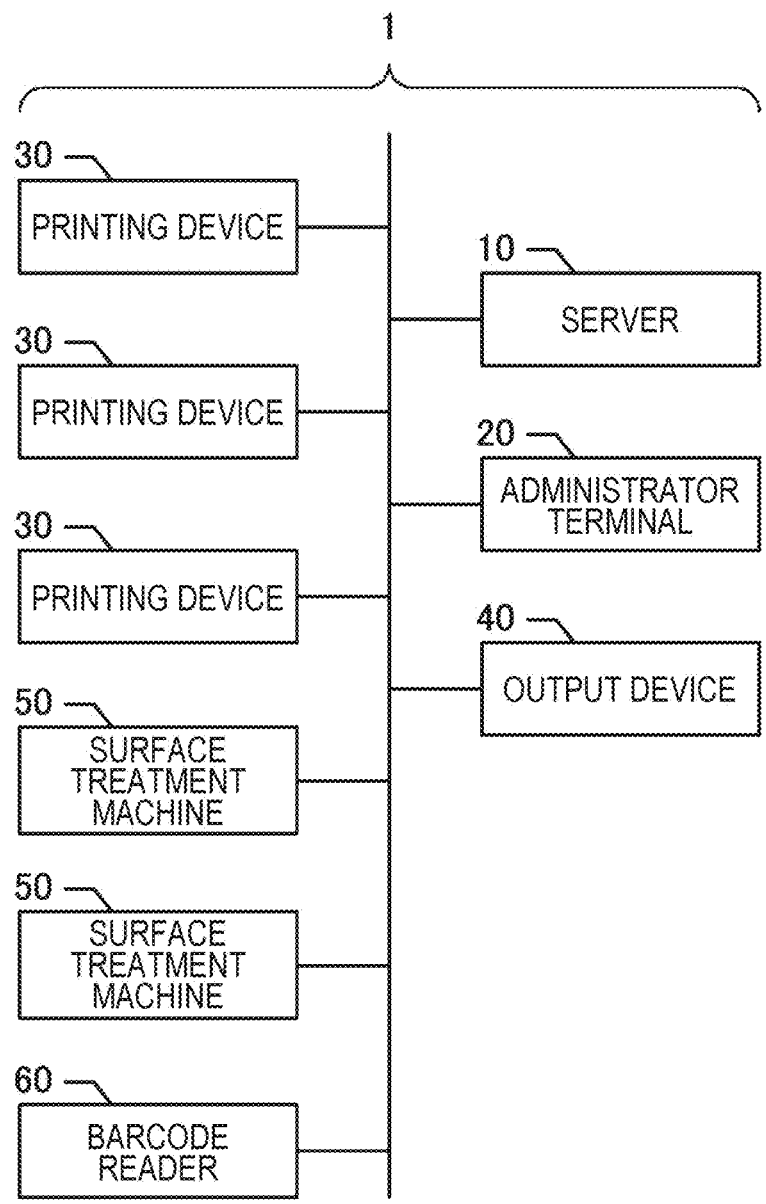
FIG. 1 is a diagram schematically illustrating an example of a production system.

FIG. 1 is a diagram schematically illustrating an example of a production system according to an embodiment of the present disclosure. The production system 1 includes a server 10, an administrator terminal 20, a printing device 30, an output device 40, a surface treatment machine 50, and a barcode reader 60. In the present embodiment, the number of illustrated devices is an example, and the number is not limited. For example, the number of printing devices 30 or surface treatment machines 50 described by a plurality of units is not limited to the number illustrated in FIG. 1, and there may be a plurality of barcode readers 60, output devices 40, and the like described as one unit. These devices can communicate with each other via a network. The mode of the network may be various modes, may be a local network, and may be a network in which devices existing at physically separated positions from each other communicate with each other via the Internet or the like.

In the present embodiment, a user as an administrator who performs a production management receives a production request from a requester. The user operates the administrator terminal 20 and inputs information indicating the content of the request. The administrator terminal 20 transmits the information to the server 10. The server 10 controls the printing device 30, the surface treatment machine 50, the barcode reader 60, and the like or person in charge of these devices in order to perform the requested production. In the present embodiment, the processing of each process for producing a print material is executed by a processing portion.

In the present embodiment, there is a case in which the processing portion is a device that executes processing, and a case in which the processing portion is a place where processing is performed or a part in charge of the processing.

For example, the printing device 30 for printing a print material and the surface treatment machine 50 for performing a surface treatment such as laminating on the print material are processing portions as devices. In the present embodiment, packing processing in a packing process of the printed print material is executed by a packing part at a work place where packing papers are stored. In the present embodiment, a packing device is not used for the packing processing.

In this case, the processing portion is the place where the packing processing is performed. However, in the present embodiment, the barcode reader 60 is installed at a place where the packing processing is performed so that the start or end of the packing processing can be specified. That is, when a worker of the packing processing starts the packing work, a barcode associated with the worker is read by the barcode reader 60. Further, when the packing work is ended, the barcode associated with the worker is read by the barcode reader 60. The reading result is transmitted to the server 10 via the network, and the server 10 is capable of starting and ending the packing processing or specifying the worker. Therefore, the worker or the packing part including the worker can be called the processing portion. A mode of the processing portion illustrated in FIG. 1 is an example, other devices, such as a cutting machine, may be included in the processing portion, and the processing of the process may be performed in other modes (for example, a mode in which packing is performed by a packing machine or the like).

In the present embodiment, the production system 1 is a system that produces the print material, and the finished product corresponding to a file is produced by performing default processing such as surface treatment on the print material in which printing is performed based on the file indicating a print target. When the file indicating the print target is different, the print material becomes different, and a different finished product is obtained. On the other hand, when processing of the same process is repeated based on the same file, a plurality of the same finished products can be produced.

In the production system 1 according to the present embodiment, printing is capable of being performed based on any file indicating the print target, and the number of finished products, which are produced based on one file, is any number. That is, it is possible to produce the print material, as many as requested, with the contents according to the request of the requester who requests the production of the finished product. In the present embodiment, the unit of request is called a matter. Further, in the present embodiment, the content of one matter is specified based on one file. For example, when two files are received from the same requester and the finished product is produced based on the two files, it means that requests for two matters are received from the requester. The number of finished products produced based on one file is any number and may vary for each matter.

Further, the requester may request that the finished product be produced for a plurality of matters and delivered together. Therefore, in the present embodiment, it is possible to group the plurality of matters into the same group, and this group is called a group. An index when grouping the plurality of matters into the same group may be various indexes and in the present embodiment, as an example, it is assumed that the plurality of matters having the same delivery date and requester, which are the matters designated by a user as a matter belonging to the same group, belong to the same group.

As described above, the production system 1 in the present embodiment proceeds with the production of a plurality of matters by receiving a plurality of groups including the plurality of matters and proceeding with processes such as printing in parallel. In order to proceed with the production smoothly, it is desirable to be able to manage such as deciding processing orders of the plurality of matters, managing the printing device so that trouble does not occur, and instructing the worker to start work at appropriate timing. In particular, even when the number of matters and groups is multiple, it is more desirable if a process management is easy. Therefore, in the present embodiment, it is configured to display for facilitating the process management.

Hereinafter, the configuration of each device of the production system 1 capable of performing such a display will be described.

Figure 2:
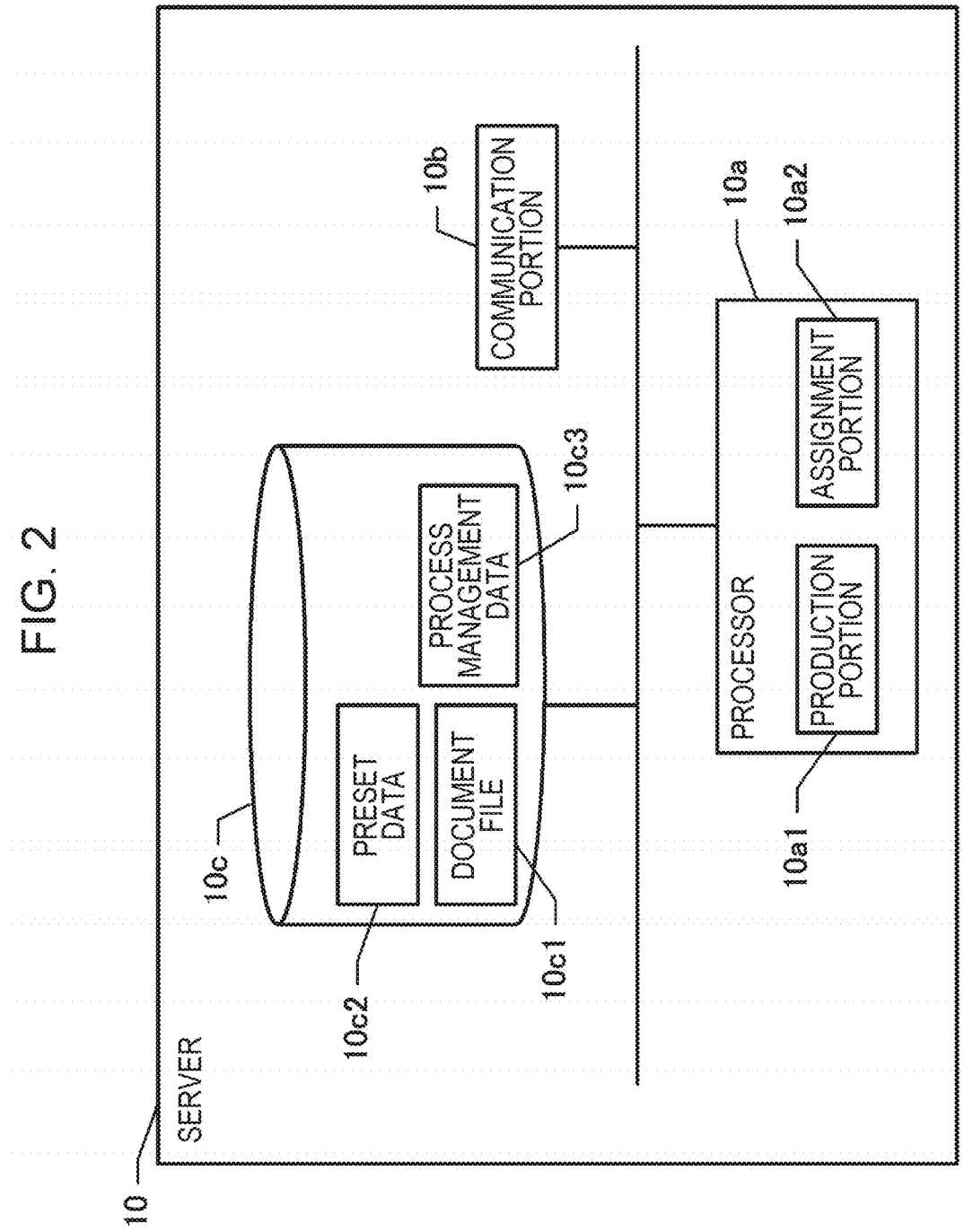
FIG. 2 is a block diagram illustrating a configuration of a server.

1-1. Configuration of Server:

FIG. 2 is a block diagram illustrating a configuration of the server 10. The server 10 includes a processor 10a, a communication portion 10b, and a non-volatile memory 10c. The processor 10a includes a CPU, ROM, RAM, or the like (not illustrated), and can execute various programs recorded in the non-volatile memory 10c to control each portion of the server 10 or each device connected to the network. The processor 10a may be configured with a single chip, may be configured with a plurality of chips, or may be configured as an SoC together with various functional blocks for operating the printing device. Further, for example, the ASIC may be adopted instead of the CPU, or the configuration may be adopted such that the CPU and the ASIC cooperate with each other. When each device in the present embodiment includes a processor, the processor can be achieved in various modes as in the processor 10a.

The communication portion 10b includes a communication interface for communicating with an external apparatus according to various wired or wireless communication protocols. The server 10 is capable of communicating with other devices via the communication portion 10b. The communication portion 10b may include an interface for communicating with various removable memories mounted on the server 10.

Various types of information are stored in the non-volatile memory 10c of the server 10. For example, the non-volatile memory 10c includes a document file 10c1 indicating a finished product. The document file 10c1 is a file including data indicating content to be printed on the print material for producing the finished product, and for example, a pdf file or the like can be the document file 10c1.

The information recorded in the non-volatile memory 10c includes preset data 10c2 which is information for reducing the burden of inputting information by the user. The preset data 10c2 is a set of values predetermined as settings for operating the processing portion such as the printing device 30. For example, in the printing device 30, it is possible to set a value indicating the contents of a plurality of items, for example, items such as a color to be used, a medium size (printing medium), a medium type, and an image processing type. In the processing portion, processing is performed in a state in which the values for each of the plurality of items are determined. For example, when the processing portion is the printing device 30, printing is performed in a state in which set values are determined for the plurality of items of a print setting. In the present embodiment, a plurality of sets of the set values, in which the values of the plurality of items are defined as specific values, are defined in advance as preset data, and are included in the preset data 10c2. The user can select the desired setting by selecting the preset data.

Further, the preset data 10c2 according to the present embodiment also includes a process preset. That is, in the present embodiment, there may be matters in which the processes required for producing the finished product are different. For example, there may be a matter in which the surface treatment by the surface treatment machine 50 is required and a matter in which the surface treatment is not required. Therefore, in the present embodiment, the preset data indicating the process to be executed up to the production of the matter is defined in advance and is included in the preset data 10c2. The user can select to execute the desired process by selecting the preset data.

Further, the non-volatile memory 10c includes process management data 10c3, which is information required for the production of the finished product or the process management. In the present embodiment, the process management data 10c3 includes information that is input by the user who operates the administrator terminal 20 and information that indicates the processing order of each matter generated from the information. The information input by the user is, for example, setting information for executing the process in each matter. The setting information includes, for example, print settings such as the matter name, the number of deliveries (the number of print copies), the medium type used for printing, the medium size, the colors to be used, or the priority level of the matter, the delivery date, the worker of the process, and the like. In the present embodiment, the priority level of the matter is defined in two stages, a matter of which the priority level is high and a matter of which the priority level is low, but it may be defined in more stages.

The information indicating the processing order of each matter is generated by the processor 10a of the server 10. That is, each of the plurality of matters belonging to the plurality of groups is processed by a plurality of processing portions such as the printing device 30, but the processor 10a performs an assignment of the processing portion that performs processing of each process of each matter. When different matters are assigned to the same processing portion, the processing order is determined. The determination of the processing order will be described in detail later. Each time the user inputs a matter, the processor 10a determines the processing order of the matter. The processing order that is determined by the processor 10a may be changeable, and in the present embodiment, the processing order can be determined by the input by the user. When the information that indicates the processing order in each processing portion is determined, the information becomes a part of the process management data 10c3 and is recorded in the non-volatile memory 10c.

Figure 3:
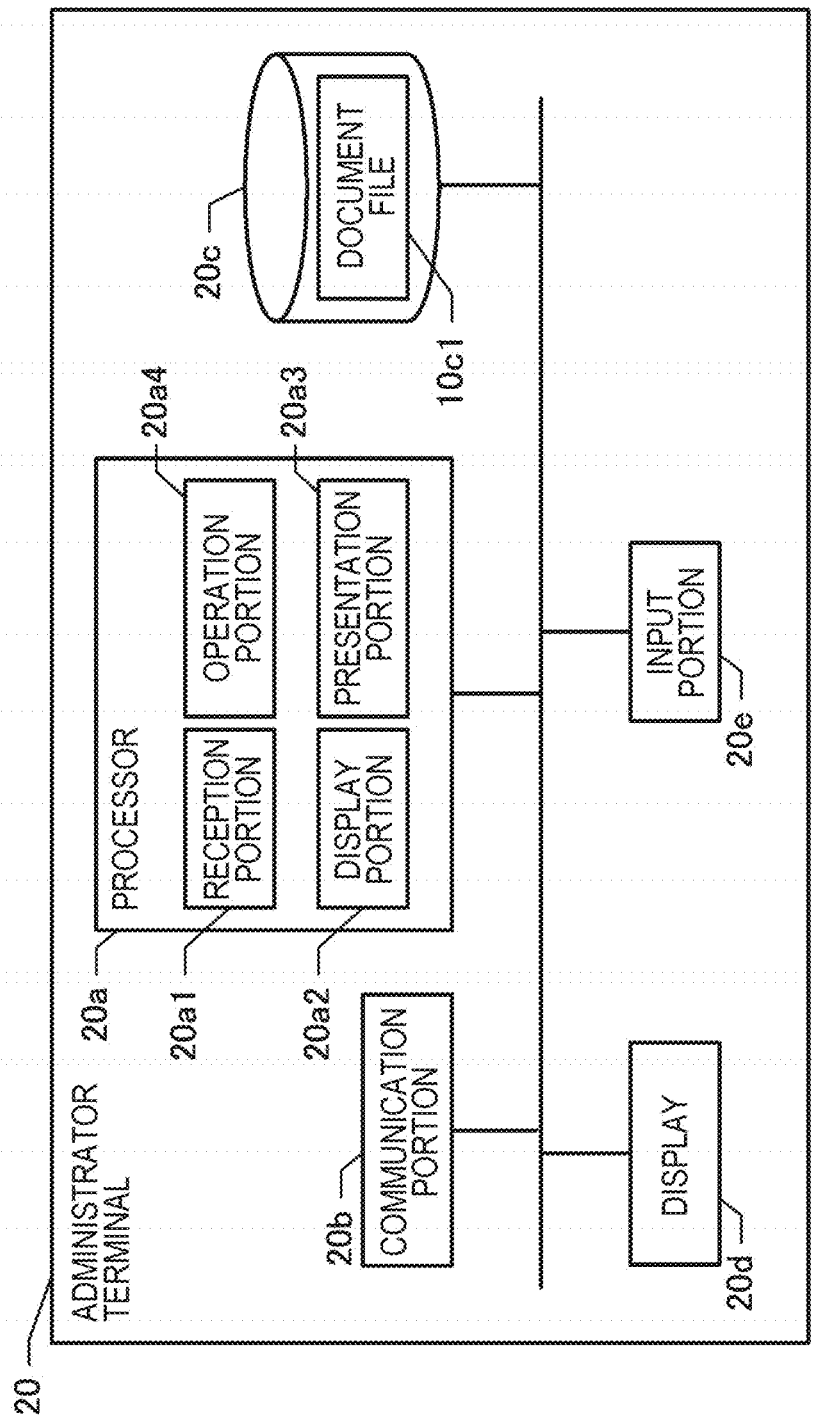
FIG. 3 is a block diagram illustrating a configuration of an administrator terminal.

1-2. Configuration of Administrator Terminal:

FIG. 3 is a block diagram illustrating a configuration of the administrator terminal 20. The administrator terminal 20 includes a processor 20a, a communication portion 20b, a non-volatile memory 20c, a display 20d, and an input portion 20e. The processor 20a includes a CPU, ROM, RAM, or the like (not illustrated), and can execute various programs recorded in the non-volatile memory 20c to control each portion of the administrator terminal 20.

The communication portion 20b includes a communication interface for communicating with an external apparatus according to various wired or wireless communication protocols. The administrator terminal 20 is capable of communicating with other devices via the communication portion 20b. Further, the communication portion 20b includes an interface for communicating with various removable memories mounted on the administrator terminal 20.

The document file 10c1, which indicates the matter, is recorded in the non-volatile memory 20c of the administrator terminal 20. The document file 10c1 may be recorded in the non-volatile memory 20c in any mode. For example, the document file 10c1, which is prepared by the requester who requested the production of the finished product, may be recorded in the removable memory and may be transferred from the removable memory to the non-volatile memory 20c via the communication portion 20b. Further, the document file 10c1 may be acquired from an external device via the network. Further, the user may create the document file 10c1 with an application program or the like by using the administrator terminal 20 and record the document file 10c1 in the non-volatile memory 20c. Of course, the document created by the requester may be edited by the user and recorded in the non-volatile memory 20c as the document file 10c1. When the matter is input, the user specifies the matter by using a file name of the document file 10c1 recorded in the non-volatile memory 20c. When the input of the matter is performed, the document file 10c1 is transferred to the server 10. These files may be temporarily stored in the volatile memory of the administrator terminal 20, transferred to the server 10, and stored in the non-volatile memory 10c of the server 10 for a long period of time.

The display 20d is a display device that displays any image. The input portion 20e is a device for the user to perform an input operation and is configured with, for example, a keyboard, a mouse, a touch panel, and the like. In any case, the user can operate the input portion 20e to input the user's intention while visually recognizing the images or characters displayed on the display 20d. In the present embodiment, the user inputs the above-mentioned setting information by using the display 20d and the input portion 20e of the administrator terminal 20 as a user interface and visually recognizes the information related to the process management. Details of the information related to the process management will be described later.

Figure 4:
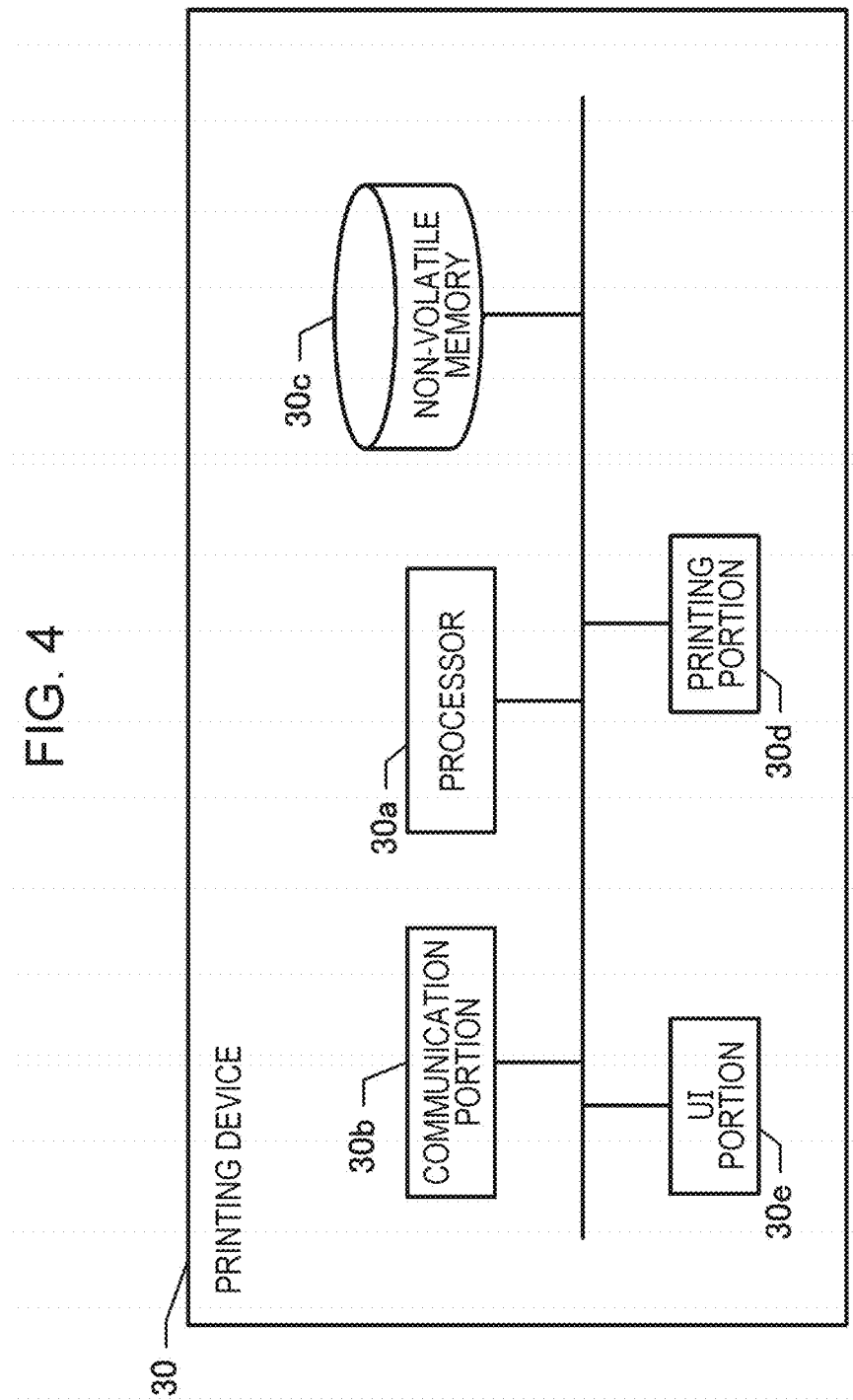
FIG. 4 is a block diagram illustrating a configuration of a printing device.

1-3. Configuration of Printing Device:

FIG. 4 is a block diagram illustrating a configuration of the printing device 30. The printing device 30 includes a processor 30a, a communication portion 30b, a non-volatile memory 30c, a printing portion 30d, and a UI portion 30e. The processor 30a includes a CPU, ROM, RAM, or the like (not illustrated), and can execute various programs recorded in the non-volatile memory 30c to control each portion of the printing device 30.

The communication portion 30b includes a communication interface for communicating with an external apparatus according to various wired or wireless communication protocols. The printing device 30 is capable of communicating with other devices via the communication portion 30b. The communication portion 30b may include an interface for communicating with various removable memories mounted on the printing device 30.

The printing portion 30d is a part that executes printing, and various printing methods such as an ink jet method and an electrophotographic method may be adopted. The printing portion 30d includes an actuator, various devices, a sensor, a drive circuit, a mechanical component, or the like for executing the printing on various media. The sensor includes a sensor that detects various detection targets that may change in the printing device 30. The detection target is not limited, and examples thereof include a sensor that detects the remaining amount of media and a sensor that detects the remaining amount of ink for each color used for the printing.

The UI portion 30e includes a touch panel display, various keys, switches, and the like. The touch panel display includes a display panel that displays various information, for example, the status of the printing device 30, the remaining amount of the ink, and the like, and a touch detection panel superimposed on the display panel, and then detects a touch operation with a human finger or the like. The processor 30a can acquire the content of the user's operation via the UI portion 30e. Further, the processor 30a can display various information on the display of the UI portion 30e and notify the user of the information.

In the present embodiment, a plurality of printing devices 30 are installed in a facility owned by a printing company, and the printing of each matter can be executed in parallel in response to a plurality of requests from a plurality of requesters. The server 10 associates the processing order for processing the printing process of each matter with each of the plurality of printing devices 30. Thereafter, the server 10 performs a start instruction of the printing of the matter the processing order with respect to the printing device 30. At this time, the server 10 performs various image processing based on the document file 10c1, which is the print target, and outputs the print data indicating the content to be printed to the printing device 30 via the communication portion 10b. The processor 30a of the printing device 30 acquires the print data via the communication portion 30b, controls the printing portion 30d based on the print data, and executes the printing. When the printing is ended, the processor 30a outputs information indicating that the printing is ended to the server 10 via the communication portion 30b. When the server 10 acquires the information via the communication portion 10b, the processor 10a specifies the matter in the next processing order of the matter for which the printing is ended and performs the print start instruction of the matter.

1-4. Configurations of Output Device, Surface Treatment Machine, and Barcode Reader:

The output device 40 is a device capable of displaying information related to the process management displayed on the administrator terminal 20 described above and may be various output devices. For example, in a factory or the like where the production system 1 is installed, when presenting the information related to the process management with respect to a plurality of workers, a projector or a large flat panel display corresponds to the output device 40. In these cases, the output device 40 can be configured with a known device, and the information related to the process management is transmitted from the server 10 and output.

The output device 40 may be another device or may be a device that outputs the information related to the process management for an individual such as a worker. Examples of such a device include mobile terminals such as smartphones and tablet terminals. Such an output device 40 can also be configured with a known device. In the case of such an output device 40, the information related to the process management may be output by being transmitted from the server 10 in a push manner or may be output by the user of the output device 40 performing a default operation.

The surface treatment machine 50 is a device for performing the surface treatment such as laminating on a print material and can be achieved by a known device. In the present embodiment, the surface treatment machine 50 can start the processing of the surface treatment in response to the instruction of the server 10, and when the processing of the surface treatment is ended, can output information indicating that the processing of the surface treatment is ended. The output of the information indicating the start instruction of the processing or end of the processing may be executed by the worker of the surface treatment machine 50.

The printing device 30 or the surface treatment machine 50 according to the present embodiment has a configuration in which the start instruction of the processing of the process is acquired from the server 10 and the end of the process is notified to the server 10, but in the processing portion that does not have such a configuration, the barcode reader 60 is installed. The barcode reader 60 can be achieved by a known configuration, and in the present embodiment, the barcode reader 60 transmits the identification information of the barcode reader 60 together with the content of the read barcode to the server 10. The server 10 stores which worker the barcode reader 60 is used in which process by associating with the identification information of the barcode reader 60 in advance. Thereby, the server 10 can recognize in which process the worker reads the barcode each time the barcode reader 60 is used. As a result, when the worker reads the barcode associated with the matter with the barcode reader 60 when the process is started, the server 10 can recognize that the processing of the matter is started. At this time, the information output with the barcode reader 60 with respect to the server 10 can be said to be the information indicating that the process is started. Further, when the worker reads the barcode associated with the matter with the barcode reader 60 when the process is ended, the server 10 can recognize that the processing of the matter is ended. At this time, the information output with the barcode reader 60 with respect to the server 10 can be said to be the information indicating that the process is ended.

2. Process Management

As described above, in the production system 1 according to the present embodiment, the plurality of matters in which the finished product is produced through the plurality of processes coexist, and further, the plurality of devices operate in parallel in a situation where the plurality of matters can be grouped together to form a group. Therefore, in the present embodiment, a list that is easy for the user to understand is displayed in order to ascertain the production status in the production system 1.

In the present embodiment, the server 10 and the administrator terminal 20 cooperate with each other to perform a display related to the process management. The processor 20a of the administrator terminal 20 functions as a reception portion 20a1, a display portion 20a2, a presentation portion 20a3, and an operation portion 20a4 by executing a program (not illustrated). The processor 10a of the server 10 functions as a production portion 10a1 and an assignment portion 10a2 by executing a program (not illustrated).

The reception portion 20a1 is a function of receiving the plurality of matters. The reception portion 20a1 controls the display 20d to display a default reception screen and receives information input by the user based on the information output from the input portion 20e. At this time, the reception portion 20a1 receives the input contents for a plurality of items for each matter. In the present embodiment, the plurality of items include items such as the matter name, the medium type, the number of deliveries, the process to be executed, and the worker of the process. The items may include items for which input of the content is not required. For example, in the item of the worker, the configuration may be allowed such that the worker of the process is not input (undecided, any value, or the like).

Further, the content of each item may be specified in various modes, and in the present embodiment, the medium type is specified by the medium name.

FIG. 5 is a diagram illustrating an example of a reception screen for receiving the matter. In the present embodiment, the reception of matters is performed in units of groups. That is, the left side of the reception screen in FIG. 5 is a part for inputting the information related to the group. Specifically, on the left side of the reception screen, input fields $B_1$ to $B_3$ of the group name, identification number (order number), and the requester name are provided. When the user operates the input portion 20e to input in the input fields $B_1$ to $B_3$, the reception portion 20a1 receives the group name, the identification number, and the requester name.

The right side of the reception screen illustrated in FIG. 5 is a part for inputting information related to the matter included in the group. Specifically, on the right side of the reception screen, input fields $B_4$ to $B_9$ of the priority level, the delivery date, the matter name, the medium name, the number of deliveries, and the treatment design are provided. Further, an icon $I_1$ indicating a preview of the print material (a thumbnail in the present embodiment) and a display box $B_{10}$ of information related to the process to be executed are provided.

The priority level is a priority level of the matter, and in the present embodiment, the user inputs the priority level in the input field $B_4$. The priority level may be specified by using another method. For example, the priority level of the matter, in which the number of remaining days until the delivery date is equal to or less than a threshold value, may be specified by using a method such as making the priority level of the matter higher than other matters. Further, in the present embodiment, since the same priority level is associated with all of the plurality of matters belonging to the same group, only one input field $B_4$ of the priority level is provided on the right side of the reception screen. It may be possible to associate different priority levels with the plurality of matters belonging to the same group, and in this case, the input field $B_4$ of the priority level is provided for each matter.

As described above, it is sufficient to provide one input field for values and the like determined for each group, and an input field for values and the like determined with the unit of the matter is provided for each matter. This relationship is the same even in the input fields of other items. In the present embodiment, the delivery date is a deadline corresponding to the matter, and in the present embodiment, is a deadline for delivering all the finished products of each matter constituting the group to the requester. In the present embodiment, the delivery date is designated by the date, but the deadline may be designated by the date and time and may be in various modes.

In the present embodiment, the matter name is the file name of the document file 10c1 indicating the print content of each matter. In the present embodiment, for example, when an input operation for the input field $B_6$ is performed, the user designates the document file 10c1 indicating the matter from the files recorded in the removable memory or the non-volatile memory 20c. When the designation is made, the processor 20a displays the file name of the document file 10c1 in the input field $B_6$ as the matter name. Further, the icon $I_1$, which is the thumbnail of the document file 10c1, is displayed right under the input field $B_6$. Of course, this configuration is an example, and any matter name may be input.

In the present embodiment, the medium name corresponds to the medium type. The user designates the medium type by inputting the medium name in the input field $B_7$. In the present embodiment, the number of deliveries is a production goal number of finished products of each matter. The user designates the production goal number by inputting the number of deliveries in the input field $B_8$. In the present embodiment, the input field $B_9$ of the treatment design is an input field for performing the instruction of the process to be executed for producing the finished product of the matter. That is, in the present embodiment, since the process to be executed may differ for each matter, it is configured such that the instruction of the process to be executed can be performed by the user.

The mode for performing the instruction of the process to be executed may be various modes. In the example illustrated in FIG. 5, the instruction of the process to be executed can be made by the user selecting the preset. That is, the information indicating the combination of processes to be executed is preset as the preset data 10c2 described above in advance. Names such as preset 1 and preset 2 are given to the preset. When the user performs an operation on the input field $B_9$, the processor 20a refers to the preset data 10c2 via the communication portion 20b and displays the preset name in a selectable manner. When the user selects the preset name, the combination of processes is instructed. The instructed combination of processes is displayed on the display box $B_{10}$.

Specifically, in the example illustrated in FIG. 5, an overview, details, man-hours, and workers for each process are displayed. The process overview is a process name, and in the matter 1 in the example illustrated in FIG. 5, each process of waiting for submission, print setting, printing, surface treatment, and packing is displayed. On the other hand, in the matter 2 in the example illustrated in FIG. 5, there are processes of the waiting for submission, the print setting, the printing, and the packing, but there is no surface treatment. The waiting for submission is a process that is executed for the matter whose content of the print target is undecided, and for example, the process of waiting for submission is present when the content indicated by the document file 10c1 can be modified. When the modification is made or it is checked that no modification needs to be made, the process of waiting for submission is ended.

The print setting is a process of performing settings required for printing each matter. When the settings are made or it is checked that the printing process can be started with the default settings, the process of print setting is ended. The printing is a process in which printing is performed by the printing device 30. The surface treatment is a process in which surface treatment such as laminating is performed on the printed print material. The packing is a process of packing the finished products of each matter belonging to the group in a default mode.

The process details are items indicating the details thereof when the processing of the process is unclear only by the overview of the process. In the overview of the same process, the details of the process may be defined when a process that is selected from a plurality of types is performed. The man-hours are a guideline for the period required for the processing of each process. A reference period (for example, a period required for one processing) required to execute the processing of each process for the number of unit productions is defined in advance and recorded in the non-volatile memory 20c. The processor 20a specifies the period required to execute the processing of the process for the number of deliveries based on the number of deliveries of each matter and the reference period and acquires the man-hours until the processing of the next process is handed over in units of days after the production requiring the period is performed. The acquired man-hours are displayed in a frame corresponding to the man-hours of the corresponding process in the display box $B_{10}$. The man-hours may be acquired in various units or may include various time associated with the processing of the process. For example, when the processing of the process is ended in one hour, the man-hours may be specified as one hour in units of hours or may be specified as one day in units of days. The latter is a method for setting man-hours suitable for, for example, a case where the processing of the next process is not started until the next day after the processing of the process is ended.

The worker is a worker who performs the processing of each process or an operator of the device that performs the processing of each process. In the present embodiment, the user can operate the input portion 20e to input the worker in the frame of the worker for each process in the display box $B_{10}$. The worker may be designated in various modes, and in the example illustrated in FIG. 5, the worker is designated by the identification information (workers A, B, and the like) assigned to the worker. Of course, the worker may be able to be changed by the operation or the like of the user through the input portion 20e.

Regarding the matters 1 and 2 in FIG. 5, it is displayed that the information indicating the matters are input, but of course, more matters may be input. When the input is made, the user performs the instruction of deciding the information input through the add button Ba. When the instruction of deciding the input information is performed, the reception portion 20a1 controls the communication portion 20b and transmits the input information to the server 10 as the setting information. When the processor 10a of the server 10 acquires the transmitted setting information, the processor 10a records the setting information in the non-volatile memory 10c as the process management data 10c3.

Further, when transmitting the information, the processor 20a transmits the document file 10c1 indicated by the input information, that is, the document file 10c1 designated by the matter name to the server 10. The processor 10a of the server 10 acquires the document file 10c1 via the communication portion 10b and records the document file 10c1 in the non-volatile memory 10c.

As described above, when the server 10 receives the information related to the matter from the administrator terminal 20, the processor 10a assigns the matter to one processing portion among the plurality of processing portions by using the function of the assignment portion 10a2. Specifically, the assignment portion 10a2 determines the processing portion that executes the first process of the matter corresponding to the received information and assigns the matter to the processing portion (the processing portion and the matter are associated with each other). At this time, the assignment portion 10a2 determines the processing order of the matter in each processing portion. Specifically, the assignment portion 10a2 refers to the process management data 10c3 and specifies the processing portion that is capable of executing the process of the newly transmitted matter.

For example, in the printing process, the assignment portion 10a2 specifies setting information such as the medium type related to the newly transmitted matter and specifies the printing device 30 capable of executing the printing indicated by the setting information. The processing that can be executed in the processing portion of the printing device 30 or the like is defined in advance and recorded in the non-volatile memory 10c (not illustrated). Therefore, the assignment portion 10a2 specifies the required processing based on the newly transmitted setting information of the matter and specifies the printing device 30 capable of executing the printing indicated by the setting information by comparing the required processing with the processing that can be executed in the printing device 30.

When the processing portion that executes each process is specified in this way, the processing portion becomes a candidate for which the newly transmitted matter is assigned. When there is only one candidate processing portion (or one location), the assignment portion 10a2 assigns the newly transmitted matter to the processing portion. When there is a plurality of candidate processing portions (or a plurality of locations), the assignment portion 10a2 specifies the processing portion for assigning the matter based on the priority level. Specifically, when the priority level of the matter, which is the target for which the processing order is determined, is low, the assignment portion 10a2 assigns the matter from the candidates of the processing portions to the processing portion having the shortest time until the processing of the matter, which is currently waiting to be processed, is ended. That is, the assignment portion 10a2 selects and assigns the processing portion that can start the processing first without changing the processing order. Thereafter, the assignment portion 10a2 adds the newly transmitted matter to the end of the processing order of the assigned processing portion.

When the priority level of the matter, which is the target for which the processing order is determined, is high, the assignment portion 10a2 selects the processing portion, to which the matter with a high priority level is not assigned, from the candidates of the processing portions and assigns the matter to the processing portion. Thereafter, the assignment portion 10a2 determines the processing order so as to be in the processing order before the matter, which is waiting to be processed (the matter for which the processing is unexecuted). That is, the processing order is determined so as to be the next processing order of the matter being processed. When selecting one processing portion from the candidates of the processing portions, the assignment portion 10a2 may select the processing portion in which the processing of the matter being processed is ended earliest.

When the matters with a high priority level are assigned with respect to all the candidates of the processing portions, the assignment portion 10a2 may assign the matter to any of the candidates of the processing portions. When the processing order is determined, the assignment portion 10a2 determines the processing order for each matter with a high priority level such that the processing order of matter to be processed earlier becomes early based on a default rule, for example, an order of earliest delivery date, an input order of the matter by the user, or the like. Thereafter, the processing of the matter of which the priority level is high is performed in the determined processing order, and the processing order of the processing of the matter of which the priority level is low is determined such that the processing is performed thereafter. When the processing order is determined, the information indicating the processing order of the matter in each processing portion is added to the process management data 10c3.

As described above, in the present embodiment, the assignment portion 10a2 sets the processing order of the processing of the matter, of which the priority level is high, before the matter waiting to be processed, but does not set the processing order before the matter being processed. Therefore, the processing order of the processing of the matter being processed is not changed even when the priority level of the matter is low. As a result, in the present embodiment, the processing of the matter of which the priority level is high is executed after executing the processing, which is being executed, of the matter of which the priority level is low, and before executing the unexecuted processing of the matter of which the priority level is low. As a result, the complicated work such as interrupting the processing of the matter being processed or restarting after the interruption can be prevented. Further, the assignment portion 10a2 automatically selects the processing place for the matter according to the priority level. Therefore, the load required for user management is reduced.

2-1. List Display:

When the matter is assigned to the processing portion and the processing order is determined, the information indicating these is recorded in the process management data 10c3. In the production system 1 according to the present embodiment, the information related to the process management can be presented to the user based on the process management data 10c3. The processor 20a of the administrator terminal 20 functions as the display portion 20a2 in a state in which each device constituting the production system 1 is being operated. The display portion 20a2 is a function of displaying a plurality of processes corresponding to each matter for each group.

In the present embodiment, the display portion 20a2 acquires the process management data 10c3 and the preview information (thumbnail information) of the document file 10c1 from the server 10 via the communication portion 20b and displays the default process management screen on the display 20d. In the present embodiment, the process management screen includes a group management screen and a device monitoring screen. On the group management screen, a list in which the received matters are grouped in a unit of the group and the group is distinguishable from other groups, is displayed. A list of matters assigned to each of the processing portions is displayed on the device monitoring screen.

FIG. 6 is a diagram illustrating an example of the group management screen. The group management screen may be displayed in response to various triggers. In the present embodiment, the group management screen is a screen displayed by default in a state in which the administrator terminal 20 is in operation. Further, the group management screen is displayed by the instruction (the mouse click or the like in a state in which the mouse pointer is aligned) with respect to the characters of "group management" displayed below the process management screen illustrated in FIG. 6.

In the example illustrated in FIG. 6, the characters "group management" and "device monitoring" are displayed below the title of the process management screen. Further, any of these is displayed in bold and underlined to indicate whether the currently displayed screen is the group management screen or the device monitoring screen.

Rectangular display boxes $B_{21}$ and $B_{22}$ indicating the group are displayed on the group management screen. Therefore, the groups displayed in different display boxes are different groups. In the top parts $Bt_{21}$ and $Bt_{22}$ of the display boxes $B_{21}$ and $B_{22}$, the priority level of the matters belonging to the group, the delivery date (deadline), and the group name are displayed. That is, the display portion 20a2 acquires the process management data 10c3 via the communication portion 20b, acquires the priority level of the matters belonging to each group, the delivery date, and the group name based on the setting information included in the process management data 10c3, and displays the acquired data on the top parts $Bt_{21}$ and $Bt_{22}$ in a text manner. In the present embodiment, the display portion 20a2 displays the relationship between the current state and the delivery date on the top parts $Bt_{21}$ and $Bt_{22}$ of the display boxes $B_{21}$ and $B_{22}$. Therefore, the display portion 20a2 acquires the current date from a timekeeping circuit (not illustrated), acquires a difference between the current date and the delivery date, and then displays a text indicating the number of remaining days until the delivery date (or a text indicating the delivery date, or a text indicating the number of passed days after the delivery date).

According to the above configuration, when there are a large number of matters, the user can easily ascertain what kind of group each matter belongs to and what kind of matter there is. Further, the priority level of the group allows the user to easily ascertain whether or not the group with a high priority level is prioritized and progressing in comparison with the group with a low priority level. Further, by displaying the information related to the deadline, the user can easily ascertain the deadline for each group. Further, the display related to the group illustrated in FIG. 6 is an example, and any of these displays may be made, or other information, such as the requester name who made the group request, may be displayed. With this configuration, the user can more clearly ascertain the characteristics of the displayed group.

Further, in the display boxes $B_{21}$ and $B_{22}$, a list of information related to the matters belonging to the group is displayed. Specifically, the display portion 20a2 specifies the matter belonging to each group based on the setting information included in the process management data 10c3. Thereafter, the display portion 20a2 displays the matters belonging to the group in the vertical direction (a first direction) and displays the processes in the horizontal direction (a second direction orthogonal to the first direction) in the processing order. That is, in the display boxes $B_{21}$ and $B_{22}$, the information on the same matter is arranged in the horizontal direction, and the information on different matters is arranged in the vertical direction.

The display portion 20a2 acquires the thumbnail information of the document file 10c1 and displays the thumbnail icon $I_1$, which is a preview of each matter, on the leftmost side of the display boxes $B_{21}$ and $B_{22}$. Further, the display portion 20a2 acquires the matter name based on the setting information included in the process management data 10c3 and displays the matter name on the right side of the preview. Therefore, the user can easily ascertain each matter.

The processes of each matter are arranged in the processing order on the right side of these previews and names. In the present embodiment, the processes are arranged in the processing order such that the more to the right side, the later the processing order. Specifically, in the example illustrated in FIG. 6, the processing is performed in the order of the waiting for submission, the print setting, the printing, the surface treatment, and the packing, and the texts indicating these processes are arranged above the display box $B_{21}$ from the left to the right in this order. In the example illustrated in FIG. 6, a rectangular frame (a frame Bf or the like) for displaying the information related to each process is provided below the texts indicating each process. Therefore, the information on different matters related to the same process is arranged in the vertical direction below the texts indicating each process. According to the above configuration, the user can ascertain the information for each matter while clearly distinguishing the information. Further, it is possible to clearly ascertain the processing order of the process for each matter. Therefore, the user can easily ascertain how the processes of the plurality of matters are progressing individually.

As described above, in the present embodiment, the processes of each matter are arranged in the processing order in the horizontal direction. On such a screen, the display portion 20a2 displays an icon indicating that the processing is being executed at a position corresponding to the process for which the processing is being executed. In the present embodiment, by the processor 10a of the server 10 to function as the production portion 10a1, the finished product is produced by executing the processing that includes the plurality of processes corresponding to the matter. That is, the production portion 10a1 specifies the processing order of each processing portion with reference to the process management data 10c3 and instructs each processing portion to start the processing via the communication portion 10b so that the processing is performed in the corresponding processing order. In the process in which the processing can be started by instructing the device to start the processing such as the printing process that is executed by the printing device, the instruction of the start of the processing is performed with respect to the device. On the other hand, in the process for which the processing is started by instructing the worker to start the processing, the instruction of the start of the processing is performed with respect to the worker. In the present embodiment, for example, a configuration in which a start instruction is displayed on the output device 40 can be mentioned. As a result, it is possible to notify the worker, who performs the work for the processing of the process, of the start of the process. In the present embodiment, since the output device 40 is a projector or a large flat panel display, it is possible to notify the worker, who is assigned for each process, of the start of the process. According to this configuration, the worker can recognize that the work, of which the worker is in charge, needs to be started.

Further, the production portion 10a1 can specify that the process is ended. That is, when the processing of each matter is ended, the printing device 30 or the surface treatment machine 50 transmits the information indicating that the processing is ended to the server 10. The production portion 10a1 acquires the information via the communication portion 10b and specifies the process for which the processing is ended. Further, a barcode reader 60 is provided in the processing portion in which the information indicating the end of the processing is not output by the device that performs the processing. When the process is ended, the worker reads the barcode, which is associated with the matter, by using the barcode reader 60. As a result, the barcode reader 60 transmits the identification information of the barcode reader 60 to the server 10. The production portion 10a1 acquires the information via the communication portion 10b and specifies the process, for which the processing is ended, and the worker of the process.

When the processing of any process is ended, the production portion 10a1 refers to the process management data 10c3 and determines whether or not there is a process next to the ended process. When there is a process, the instruction of the start of the processing of the process is made. According to the above processing, the production portion 10a1 can execute the processing of the matter of which the priority level is high, before executing the unexecuted processing of the matter of which the priority level is low. Specifically, the processing order of the matter in the processing portion is determined by the function of the assignment portion 10a2 as described above, and the processing order is recorded in the process management data 10c3. In the processing order, the processing order is determined such that the processing order of the matter of which the priority level is high, precedes the unexecuted processing of the matter of which the priority level is low. Therefore, in the production portion 10a1, by instructing each processing portion to start the processing of the process based on the process management data 10c3, the production portion 10a1 can execute the processing of the matter of which the priority level is high before executing the unexecuted processing of the matter of which the priority level is low. According to the above configuration, it is possible to prioritize the processing of the matter of which the priority level is high.

Further, in order to proceed with the processing in the processing order indicated by the process management data 10c3, the production portion 10a1 can execute the processing of the matter of which the priority level is high after executing the processing, which is being executed, of the matter of which the priority level is low, and before executing the unexecuted processing of the matter of which the priority level is low. Further, since the production portion 10a1 causes the processing portion, which is indicated by the process management data 10c3, to execute the processing of each process, the production portion 10a1 can automatically select the processing place for the matter according to the priority level.

When the processing in each process is started or ended, the production portion 10a1 records the information indicating the process for which the processing is started or the process for which the processing is ended in the process management data 10c3. As described above, the production portion 10a1 can collect the information from each processing portion, execute the processing of the process of each matter by performing the instruction to each processing portion, and produce the finished product of each matter. As described above, the processor 10a is capable of making an instruction or capturing the start of the processing in each processing portion and capturing the end based on the process management data 10c3. Therefore, the processor 10a can specify the processing in each matter to the process that is currently being executed. When the process for which the processing is being executed is specified, a process before the process is specified to be an already executed process, and a process after the process, which is being executed, is specified to be an unexecuted process.

Therefore, the processor 20a inquires the server 10 about the processing, which is being executed, in each matter via the communication portion 20b by functioning as the display portion 20a2. The processor 10a of the server 10 transmits the information indicating the processing, which is being executed, in each matter in response to the inquiry via the communication portion 10b. By receiving the information, the display portion 20a2 specifies the processing, which is being executed, in each matter.

When the processing, which is being executed, in each matter is specified, the display portion 20a2 displays an icon indicating that the processing is being executed at a position corresponding to the process for which the processing is being executed. The icon indicating the process for which the processing is being executed may be in various modes, but in the example illustrated in FIG. 6, the circular icon $I_2$ colored in black is an icon indicating that the processing is being executed. Further, in the example illustrated in FIG. 6, the process for which the processing is being executed for the matter 1 is the printing process. Therefore, in this case, the display portion 20a2 displays the icon $I_2$, which indicates that the processing is being executed, in the frame Bf corresponding to the printing process currently being executed. According to the above configuration, the user can easily ascertain the processing which is currently being executed in each matter.

Further, in the present embodiment, the display portion 20a2 displays the process for which the processing is unexecuted, the process for which the processing is already executed, and the process for which the processing is not to be executed, for each matter, in a distinguishable manner from each other. Specifically, the display portion 20a2 also displays the icons indicating the process for which the processing is unexecuted, the process for which the processing is already executed, and the process for which the processing is not to be executed on the group management screen. The icon indicating the process for which the processing is unexecuted may be in various modes, but in the example illustrated in FIG. 6, the white circular icon $I_3$ is an icon indicating that the processing is unexecuted. Further, in the example illustrated in FIG. 6, the process for which the processing is unexecuted for the matter 1 is the surface treatment process and the packing process. Therefore, the display portion 20a2 displays the icon $I_3$ indicating the process for which the processing is unexecuted in the frame corresponding to these processes.

In the example illustrated in FIG. 6, the circular icon $I_4$ colored in gray is an icon indicating the already executed process. Further, in the example illustrated in FIG. 6, the already executed process for the matter 1 is the waiting for submission process and the print setting process. Therefore, the display portion 20a2 displays the icon $I_4$ indicating the process for which the processing is already executed in the frame corresponding to these processes. As described above, in the present embodiment, the icon $I_3$ indicating the unexecuted process, and the icon $I_4$ indicating the already executed process have the same shape and different colors. Therefore, the icon $I_3$ and the icon $I_4$ are similar. In this way, when similar icons are used for the icon $I_3$ indicating the unexecuted process and the icon $I_4$ indicating the already executed process, it can be suggested that the meanings of both icons are similar (a process is present). Further, it can be suggested that the meanings of both the icons are different (progress is different) because both the icons are similar but not the same.

In the example illustrated in FIG. 6, information such as circular icons or characters is not displayed in the process for which the processing is not to be executed. That is, on the group management screen, the frames are displayed and arranged in the vertical direction below the characters indicating the processes so that each frame becomes a part that displays the information related to each process. The display portion 20a2 does not display icons or characters in the frame corresponding to the process for which the processing is not to be executed. According to this configuration, by not displaying the icons or the characters in the frame, it is possible to clearly specify the process that is not required for producing the finished product of each matter.

As in the above configuration, when a process for which the processing is unexecuted is clearly specified, the user is able to ascertain that the process will be performed from now on and can prepare or prevent troubles. When the process for which the processing is already executed is clearly specified, the user can ascertain that the process is already completed. Therefore, it can be understood that process management is no longer required for the process in order to produce the finished product of the relevant matter. Further, when a process that is not required for producing the finished product is clearly specified, the user can ascertain that process management is not required for the process in order to produce the finished product of the corresponding matter.

The group management screen as described above is updated according to the progress of the process. That is, the display portion 20a2 inquires the server 10 about the processing, which is being executed, in each matter in response to a default trigger (for example, a periodic trigger or a trigger corresponding to the start or end of the processing in the processing portion). When the processor 10a of the server 10 returns the information in response to the inquiry, the display portion 20a2 updates the processing, which is being executed, in each matter by receiving the information. The display portion 20a2 updates the group management screen based on the updated information.

Therefore, when the processing for a certain process is ended and the processing for the next process is started, the icon indicating the processing, which is being executed, moves within the frame on the right side. Further, the icon indicating that the already executed processing is displayed in the frame corresponding to the process in which the icon indicating the processing, which is being executed, is displayed until immediately before. According to the above configuration, the user can ascertain the progress of the process for each matter. Further, in the present embodiment, as described above, a list of information related to the matters belonging to the group is displayed. Therefore, in the present embodiment, the user is able to ascertain a plurality of matters by associating the matter with a group and can easily ascertain the progress of each group in addition to the progress of the matter.

Further, in the present embodiment, a production goal number of the product corresponding to each matter is displayed. That is, the display portion 20a2 acquires the number of deliveries, which is the production goal number of each matter, based on the setting information included in the process management data 10c3. The display portion 20a2 displays the number of deliveries on the right side of the icon $I_2$ in the same frame as the frame in which the icon $I_2$ indicating the process for which the processing is being executed is displayed. Therefore, the user can ascertain the number of deliveries of each matter based on the number of deliveries and can ascertain the magnitude of the load or the like while executing the production of each matter. The numerical value displayed in the frame may change according to the progress of the processing of the process. For example, the configuration may be such that the remaining number of processing of each process is displayed as a numerical value.

As described above, in the present embodiment, since the display portion 20a2 updates the group management screen according to the progress of the process, in the operation process, there may be a mixture of matters in which the process is ended and the matter in which the process is not ended. Therefore, in the present embodiment, the display portion 20a2 has a configuration in which a group that does not need to be displayed is hidden. Specifically, the display portion 20a2 hides the group according to the completion of the processes corresponding to all the matters included in the group. On the other hand, in a state in which the process corresponding to only a part of the matters included in the group is completed, the display portion 20a2 displays all the matters included in the group, which are all matters including matters for which the process is completed, and the group. That is, in the state in which the processes corresponding to only a part of the matters included in the group are completed, none of the matters included in the group is hidden.

For example, in the example illustrated in FIG. 6, when the packing process is ended for all of the matters 3 to 5 which are in the group named "group 2", the information related to the "group 2" is hidden. The mode for hiding the group may be various modes. For example, the below part is configured to be expandable by operating the top parts $Bt_{21}$ and $Bt_{22}$ of the display boxes $B_{21}$ and $B_{22}$ and when it is hidden, the information related to the matter may not be expanded so that it can be hidden. In this case, it may be possible to redisplay by giving an instruction to a mark at the left end of the top parts $Bt_{21}$ and $Bt_{22}$ of the display boxes $B_{21}$ and $B_{22}$. In any case, it is possible to make the display of the group management screen easier to see by hiding the group matters in which the processes corresponding to all the matters are ended.

Further, in the present embodiment, the display portion 20a2 displays at least one of the process of which the deadline was exceeded and the process of which the deadline is about to be exceeded so as to be distinguishable from the case where there is room until the deadline. In order to achieve such a display, in the present embodiment, the deadline is set for at least one of the plurality of processes, and the deadline is displayed. The deadline may be defined by using various methods, but in the present embodiment, it is specified from the delivery date of the matter and the man-hours of the process. Specifically, the display portion 20a2 specifies the delivery date and the man-hours of each matter based on the setting information included in the process management data 10c3.

The display portion 20a2 considers that the delivery date of the matter is the deadline of the last process of the matter. For example, when the matter 1 illustrated in FIG. 6 is the matter 1 illustrated in FIG. 5, and the delivery date is set to May 30, 2021, as illustrated in FIG. 5, the display portion 20a2 considers that the deadline for the last process is May 30, 2021. The display portion 20a2 displays the deadline in association with the last process. In the example illustrated in FIG. 6, the deadline of May 30 is displayed in the frame corresponding to the packing process which is the last process.

Further, when the man-hours are recorded in the setting information included in the process management data 10c3, the display portion 20a2 specifies the deadline based on the man-hours. For example, as the matter 1 illustrated in FIG. 5, it is assumed that the packing process requires one day, the surface treatment requires two days, and the printing process requires three days of man-hours. In this case, in order for the packing process to be ended within May 30, which is the delivery date, it is necessary that the processing of the surface treatment is ended at least one day before the packing process. Therefore, the display portion 20a2 reduces one day, which is the man-hours of the packing process, from May 30, which is the deadline for the packing process and sets the deadline for surface treatment to May 29. Similarly for the printing process and the print setting process, the display portion 20a2 considers that the deadline for the printing process is May 27 and the deadline for the print setting process is May 24 by reducing the man-hours from the deadline of the immediately following process. When the deadline for each process is specified, the display portion 20a2 displays the deadline for each process in the frame corresponding to each process. However, in the present embodiment, the deadline for the process for which the processing is already executed is not displayed. As described above, in the present embodiment, the display portion 20a2 displays the list of the matters, the plurality of processes corresponding to the matters, and the deadlines. As a result, the user is able to easily ascertain the deadline for each matter.

The deadline may be specified by using another method, and for example, as a deadline, a configuration or the like input by the user can be adopted. Further, in the present embodiment, the deadline is not displayed in the process for which the processing is already executed, but this configuration is an example, and for example, in the process for which the processing is already executed, it may be configured such that the deadline is grayed out. According to the above configuration, the user can easily ascertain the deadline for each process based on the group management screen and can easily ascertain the delay or the like of the process by comparing the deadline with the current date.

As described above, in the configuration of which the deadline is displayed, in the present embodiment, the display portion 20a2 displays at least one of the process of which the deadline was exceeded and the process of which the deadline is about to be exceeded in a distinguishable manner. In the present embodiment, by displaying an alert in association with the process of which the deadline was exceeded or the process of which the deadline is about to be exceeded, the display that can be distinguished from other processes is performed. In the present embodiment, in order to perform such a display, the display portion 20a2 determines whether or not the deadline for the process is exceeded based on the deadline and the current date and time. That is, when the date of the deadline for the process is earlier than the current date, the display portion 20a2 determines that the deadline for the process is exceeded. Further, the display portion 20a2 determines whether or not the deadline for the process is near, based on the deadline and the current date and time. In the present embodiment, a threshold value for determining whether or not the deadline is near is determined in advance. When the date obtained by reducing the threshold value from the date of the deadline for the process is the same as the current date or the current date is later, the display portion 20a2 determines that the deadline for the process is about to be exceeded.

When it is determined that the deadline of the process is exceeded or the deadline is about to be exceeded, the display portion 20a2 displays an icon indicating the alert in association with the process. In the example illustrated in FIG. 6, the current date is assumed to be 5 days before the delivery date, that is, May 25, 2021. The deadline for the printing process of the matter 1 is May 27, and it is assumed that the deadline is near. In this case, the display portion 20a2 displays the icon Is indicating the alert in the frame Bf corresponding to the printing process. According to this configuration, the user can easily ascertain the process of which the deadline was exceeded or the process of which the deadline is near, and can easily ascertain the process which requires to be dealt with preferentially. In the example illustrated in FIG. 6, the date of the deadline and the current date are compared, but when the time is associated with the deadline, it may be configured in which the current date and time are compared with the deadline.

The user may be able to execute various operations on the group management screen. For example, the details may be displayed or the setting information may be able to be modified by performing the instruction of the icon, the name, or the process of the matter. Further, on the group management screen illustrated in FIG. 6, the user is able to execute the print setting process. That is, the setting button $B_{23}$ is provided in the frame of the print setting process. When the user performs an operation on the setting button $B_{23}$ by operating the input portion 20e of the administrator terminal 20, the display portion 20a2 refers to the preset data 10c2 that is recorded on the server 10 and displays the presets in a selectable manner. The preset is a combination of settings that can be set in the printing on the printing device 30 that performs the printing for the matter 1. When the user selects the preset, the user can set the print setting so that the settings are registered as the presets. The print setting may be executable with any terminal, for example, the output device 40 or may be executable by operating the UI portion 30e of the printing device 30.

In the present embodiment, various instructions can be executed other than the setting button $B_{23}$ that performs an instruction of the start of the print setting process, and various operations in response to the instructions can be executed. As one of the operations, there is an output instruction of a recovery plan for the process of which the deadline was exceeded or the process of which the deadline is about to be exceeded. Such an output instruction may be executed in various modes, and in the present embodiment, the user can perform the output instruction of the recovery plan by operating the input portion 20e and operating the icon Is indicating the alert.

Specifically, the processor 20a of the administrator terminal 20 can function as a presentation portion 20a3. The presentation portion 20a3 is a function of automatically creating and presenting the recovery plan for at least one of the process of which the deadline was exceeded and the process of which the deadline is about to be exceeded. In the present embodiment, the recovery plan for the process of which the deadline was exceeded and the process of which the deadline is about to be exceeded is an alternative plan in which the number of processing portions for performing the processing of the process is increased over the current number of processing portions.

That is, in the production system 1 according to the present embodiment, a plurality of printing devices 30 or the surface treatment machines 50 are in operation, or it is possible to increase or decrease the number of processing portions for processing any process. Therefore, when the number of processing portions that executes the processing of the same process is increased, the speed at which the processing of the process is performed can be increased. In the present embodiment, the presentation portion 20a3 presents the recovery plan to the user by assigning a larger number of processing portions than the current number of processing portions with respect to the process and presenting the assignment to the user. At this time, an estimated value of the time when the process is completed may be presented by using the recovery plan.

Specifically, the presentation portion 20a3 automatically creates the recovery plan based on the deadline for the process and the current date and time. When the recovery plan for the process of which the deadline was exceeded is automatically created, the presentation portion 20a3 specifies the number of excess days based on the deadline of the process and the current date and time, assigns a large number of processing portions, which are as many as the number of excess days, to the process, and creates the recovery plan. That is, the presentation portion 20a3 refers to the setting information included in the process management data 10c3 and specifies the processing portion capable of executing the processing of the process of which the deadline was exceeded. The presentation portion 20a3 assigns the processing portion, which is currently assigned to the process of which the deadline was exceeded, and the processing portion, which is capable of executing the processing of the process of which the deadline was exceeded, to the process of which the deadline was exceeded, and defines as the recovery plan.

When the recovery plan for the process of which the deadline is about to be exceeded is automatically created, the presentation portion 20a3 specifies the number of remaining days until the deadline based on the deadline for the process and the current date and time and assigns the processing portion to the process so that the remaining processing can be executed within the number of remaining days. Specifically, the presentation portion 20a3 specifies the number of productions remaining in the process of which the deadline is about to be exceeded (for example, the number of remaining print copies in the case of a printing process). Further, the presentation portion 20a3 specifies a reference period (for example, a period required for one processing) required for executing the number of unit productions in the processing portion. Further, the presentation portion 20a3 specifies the processing portion capable of executing the processing of the process of which the deadline is about to be exceeded. Thereafter, regarding the number of productions remaining in the process of which the deadline is about to exceed, by using the plurality of processing portions capable of executing the process, the presentation portion 20a3 specifies the processing portion so that the process can be ended by the deadline. That is, the presentation portion 20a3 assigns the processing portion, which is currently assigned to the process of which the deadline is about to be exceeded, and the processing portion, which is capable of executing the processing of the process of which the deadline is about to be exceeded, to the process of which the deadline is about to be exceeded, and defines as the recovery plan.

Figure 7:
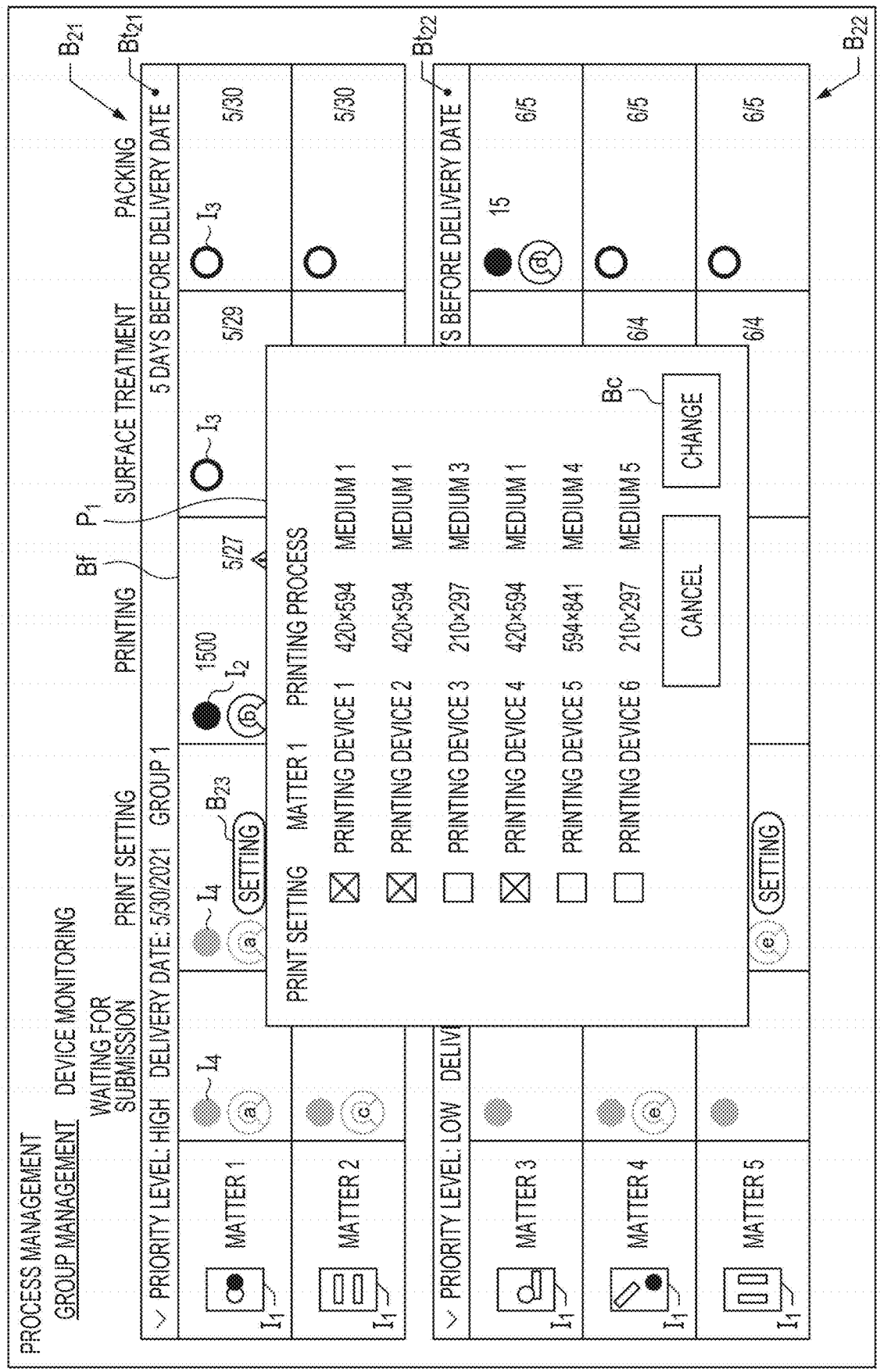
FIG. 7 is a diagram illustrating an example of a display portion displayed in a pop-up manner.

The recovery plan may be presented in any mode, but in the present embodiment, the presentation portion 20a3 presents a print setting screen in which the plurality of processing portions included in the recovery plan are selected in a pop-up display in response to the output instruction of the recovery plan. FIG. 7 illustrates an example of a display portion $P_1$ displayed in a pop-up manner. In this example, the medium size (420×594, or the like) and the medium type (medium 1, or the like) are displayed in a list manner in association with each of the printing devices being operated in the production system 1. Further, in this example, a check box is associated with each of the printing devices, and a state in which the printing devices 1, 2, and 4 assigned to the printing process are checked is presented. That is, the recovery plan using these printing devices 1, 2, and 4 is presented.

The user can change the print setting by operating the input portion 20e. For example, the number of printing devices assigned to the printing process can be increased or decreased at any number. Further, the user can change the medium size, the medium type, and the like used in the printing device. In the example illustrated in FIG. 7, the recovery plan for the printing process of the matter 1 is illustrated, and it is assumed that the printing device first assigned to the printing process of the matter 1 is the printing device 1. The medium size and the medium type of the media used in the printing devices 2 and 4 are the same as the medium size and medium type of the media used in the printing device 1. On the other hand, the media used in the printing devices 3, 5, and 6 are different in the medium size and the medium type from the media used in the printing device 1. Therefore, in the example illustrated in FIG. 7, the recovery plan is illustrated in a state in which the printing devices 1, 2, and 4 are selected, but the user is also able to select the printing device different from the recovery plan and perform the instruction of the print setting.

Further, the user can perform the instruction of changing the print setting displayed on the display portion $P_1$ by operating the input portion 20e and selecting the change button Bc displayed on the display portion $P_1$. When the change instruction is performed, the processor 20a transmits the instruction content (printing device, medium size, medium type, or the like) to the server 10 via the communication portion 20b. The processor 10a receives the transmitted information via the communication portion 10b and acquires the processing portion and the setting thereof indicated by the information as the processing portion and the setting of the process of which the deadline was exceeded or the process of which the deadline is about to be exceeded.

Thereafter, the assignment portion 10a2 changes the assignment and the processing order such that the processing of these processes is executed with the highest priority in the processing portion of the process of which the deadline was exceeded or the process of which the deadline is about to be exceeded. As a result, the assignment and the processing order of the processing portion are changed, and the process management data 10c3 is updated by the changed information. After that, the process management is performed according to the updated process management data 10c3. Therefore, the display portion 20a2 displays the process management screen based on the updated process management data 10c3. According to the above configuration, the user can easily improve the progress of the process when the progress of the process is delayed.

The recovery plan in the present embodiment is a plan for early proceeding with the process of which the deadline was exceeded or the process of which the deadline is about to be exceeded, but a recovery plan for early proceeding with the process after these processes may be presented. According to this configuration, when the progress of the process is delayed, the possibility that the progress of the process is improved can be increased.

Various other displays can be included in the list display according to the present embodiment. In the example illustrated in FIG. 6, the worker of the process is displayed in association with the process. That is, the display portion 20a2 refers to the process management data 10c3 and displays the corresponding worker in association with the process, in which the worker is determined.

Further, when the barcode associated with the matter is read by the barcode reader 60, the identification information of the corresponding barcode reader 60 is output. Even when the process is ended, the barcode associated with the matter is read by the barcode reader 60, and the identification information of the corresponding barcode reader 60 is output. Based on the information, the server 10 is able to specify the start or end of the processing of the process and the worker thereof. Since the information indicating the start and end of the process is recorded in the process management data 10c3, the display portion 20a2 can specify the worker of the process by referring to the process management data 10c3. In the present embodiment, regarding the process, the display portion 20a2 also displays the worker in association with the process. As a result, the worker who received the start of the process is displayed in a state associated with the received process. The barcode, which is associated with the matter, may be a barcode included in an instruction sheet issued for each matter or may be a barcode included in an image printed in the printing process.

In FIG. 6, an icon indicating the worker is displayed in the frame indicating a process. In the present embodiment, the icon is a face photograph registered in advance by the worker, and in FIG. 6, for example, the icon of the worker D is schematically illustrated as an icon $I_{61}$. Further, in the present embodiment, the color of the icon of the worker, which is associated with the process that is being executed and the unexecuted process, is a normal color. On the other hand, the color of the icon of the worker associated with the process, for which the processing is ended and the processing is already executed, is displayed in a grayed out state.

According to the above configuration, the user is able to ascertain the worker of each process based on the group management screen. Further, when the worker is notified of the start of the process, the worker is associated with the process and displayed. Therefore, the worker can easily ascertain whether or not the process is a process that requires work to be done by the worker from now on based on the icon of the worker. Further, in the present embodiment, for example, the packing process is a process in which the start and the end of the process are specified by the barcode reader 60. Therefore, when the icon $I_{61}$ that is not grayed out is displayed for the packing process, which is being executed, in the matter 3 illustrated in FIG. 6, the user can recognize that the packing process is started. On the other hand, when the icon is not displayed in association with the process, the user can recognize that the packing process is not started.

Further, in the present embodiment, the display portion 20a2 specifies the worker based on the process management data 10c3 and displays the worker in association with the process. Therefore, when the worker is decided before the start of the processing of the process, that is, when the worker who is scheduled to be in charge of the work of the process is decided, the worker is also displayed in a state in which the work is associated with the process. Therefore, the user or the worker can ascertain the worker of the scheduled work.

Further, in the present embodiment, the display portion 20a2 displays the grayed out icon in association with the already executed process. Therefore, in the present embodiment, after the process is ended, it becomes a state in which the worker who completed the work of the process is displayed in association with the process. Therefore, according to the present embodiment, it is possible to specify whether or not the process is ended by a scheduled worker. As a result, the user is able to consider whether or not the worker is appropriate.

2-2. Device Monitoring Screen:

Next, the device monitoring screen will be described in detail. In the present embodiment, the display portion 20a2 can display the device monitoring screen for performing management related to a device as the processing portion that executes the processing of the process, on the display 20d. In the present embodiment, the device monitoring screen can be displayed for each type of device as the processing portion. For example, when there are the printing device, the surface treatment machine, and the cutting machine as the processing portions, the management screen related to each of the devices is displayed as the device monitoring screen for each type of device.

Figure 8:
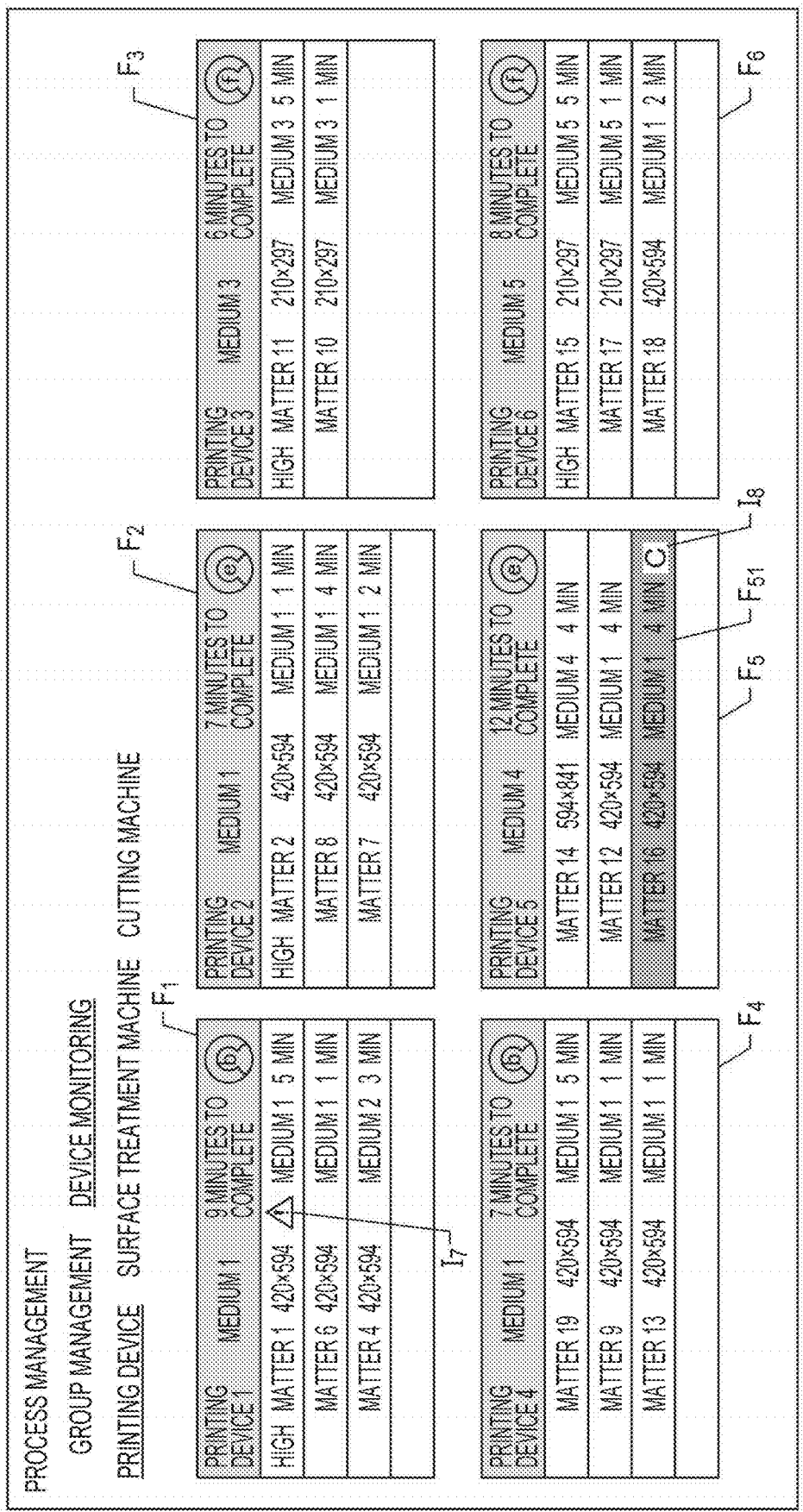
FIG. 8 is a diagram illustrating an example of a device monitoring screen.

Specifically, the display portion 20a2 refers to the process management data 10c3 and specifies the matter that is assigned to the processing portion which is a display target. Thereafter, the display portion 20a2 controls the display 20d, associates the processing portion with the assigned matter, and displays a list. FIG. 8 illustrates an example of the device monitoring screen when the printing device 30 is defined as a display target. In the device monitoring screen illustrated in FIG. 8, frames $F_1$ to $F_6$ corresponding to each printing device 30 are displayed.

Further, in each of the frames $F_1$ to $F_6$, the information related to each printing device 30 is displayed. Therefore, the display portion 20a2 refers to the process management data 10c3 via the communication portion 20b and acquires the information related to the printing device 30. The information related to the printing device 30 displayed on the device monitoring screen may be various information. In the present embodiment, as the relevant information, information indicating the identification information of the printing device 30, the medium type used in the printing device 30, required time until the processing of all matters assigned to the printing device 30 is ended (information corresponding to the estimation time until the printing device 30 becomes available), and the worker in charge of the processing of the printing device 30 are included.

In the example illustrated in FIG. 8, the above-described information is displayed in the light gray colored rectangle at the top part of each of the frames $F_1$ to $F_6$. For example, in the frame $F_1$, the "printing device 1" is the identification information of the printing device, and the "medium 1" is the medium type used in the printing device 1. "9 minutes to complete" is the estimation time until the printing device 30 becomes available, and the icon with b displayed in the upper right of the frame $F_1$ is a face photograph of the worker.

The estimation time until the printing device 30 becomes available is capable of being specified based on the process management data 10c3. That is, in the process management data 10c3, the number of productions (the number of print copies) in each matter is recorded. For the matter being processed, the number of productions remaining is recorded. The display portion 20a2 can acquire the time required for the processing based on the number of productions and the reference period required for executing the number of unit productions. Therefore, it is possible to acquire the estimation time until the printing device 30 becomes available by accumulating the time required for the processing of all the matters assigned to the same printing device. The display portion 20a2 acquires the estimation time and displays the estimation time in the frame.

Further, in the present embodiment, the display portion 20a2 also displays the information related to the matter assigned to each printing device 30 in the frames $F_1$ to $F_6$. That is, the display portion 20a2 refers to the process management data 10c3 and acquires the matter and the processing order assigned to each printing device 30. Thereafter, the display portion 20a2 arranges the information on each matter from the top to the bottom in the order of the earliest processing order and displays the information in the frames $F_1$ to $F_6$. Therefore, the matter, which is displayed at the top, is a matter for which the processing is started earliest in the printing device 30, and when the printing process is started in the printing device 30, it is a matter which is being processed.

In the example illustrated in FIG. 8, as the information on each matter, the priority level, the identification information (name) of the matter, the medium size, the medium type, and the required time until the processing of the matter is ended are included. In FIG. 8, the matter, of which the priority level is high, is associated with the characters "high" and displayed, and the display is not performed related to the priority level for the matter of which the priority level is low. Characters such as "420×594" indicate the medium size. Characters such as "medium 1" indicate the medium type. Characters such as "5 minutes" indicate the required time until the processing of the matter is ended.

According to the above configuration, since the information for each printing device 30 as the processing portion is displayed as a list on the device monitoring screen, the user can easily ascertain the information for each processing portion. Further, in the present embodiment, in the list displayed on the device monitoring screen, the matters that are assigned to each of the processing portions are displayed in the processing order in the processing portion. Therefore, the user is able to easily ascertain the matter for which the processing is performed in each processing portion, and further is able to easily ascertain the processing order of each matter. Further, in the present embodiment, the list displayed on the device monitoring screen includes the priority level associated with the matter. Therefore, the user is able to easily ascertain whether or not the matter having a high priority level is preferentially processed with respect to the matter having a low priority level for each processing portion.

In the present embodiment, it is possible to move the matter for which the processing is unexecuted by the user's operation on the device monitoring screen. The operation portion 20a4 causes the processor 20a to achieve the function of receiving the operation. In the present embodiment, the movement of the matter is executed by a drag operation that is executed by a mouse or the like as the input portion 20e. Therefore, the matter can be easily moved.

The movement of the matter is an operation for performing at least one of the assignments to the printing device 30 and the change of the processing order. Specifically, the user performs the drag operation on the matter by the input portion 20e and performs a drop operation on the matter at any position. When the operation of moving the displayed matter is performed by this operation, the operation portion 20a4 reassigns the moved matter to the processing portion corresponding to the position after the movement in response to the operation. That is, the operation portion 20a4 updates the process management data 10c3 such that the matter for which the drag operation and the drop operation are performed is deleted from the processing order of the printing device 30 to which the matter is assigned before the movement. Further, the operation portion 20a4 changes the processing order in the processing portion to the processing order corresponding to the movement of the matter. That is, the operation portion 20a4 assigns the matter in which the drop operation is performed to the printing device 30 that is a target in which the drop operation is performed, and updates the process management data 10c3 such that the processing order of the matter becomes a processing order corresponds to a position where the drop operation is performed. In the drop operation, a display position of the matter, which is a movement destination, may be automatically moved such that the processing order of the moved matter is clearly specified. When the process management data 10c3 is updated, the display portion 20a2 displays the device monitoring screen based on the updated information. According to the above configuration, the user is able to change the assignment destination and the processing order of the matter by a simple operation.

In the present embodiment, the operation of changing the matter of which the priority level is low to the earlier processing order than the matter of which the priority level is high, is prohibited. That is, in the matter of which the priority level is low, the operation portion 20a4 does not receive a change in which the processing order of the moved matter becomes an earlier processing order than that of other matters of which the priority level is high. Therefore, it is possible to prevent the processing of the matter to be processed with priority from being delayed. Such a configuration is an example, the processing order may be changed in response to the user's instructions instead of following the priority level, and when the operation to change the matter of which the priority level is low to the processing order earlier than the matter of which the priority level is high is performed, the display portion 20a2 may display a warning indicating that the processing order of the matter of which the priority level is high is delayed, for example. Further, when the warning is displayed, the change may be allowed in response to the user's selection.

Further, it may be possible to assist the movement of the matter in response to the dragging operation on the matter by the user. Specifically, the processing portion, in which the same medium type as the medium type used in the matter is set, may be displayed so as to be distinguishable from other processing portions. Further, when the priority level of the matter is high, the estimation time until the processing of only the matter having a priority level higher than the priority level of the matter for each processing portion, is completed may be displayed. Further, the processing portion in a state in which the processing cannot be performed due to an error or the like may be grayed out so that the drop operation cannot be performed on the processing portion. Alternatively, when the matter is assigned in the earlier processing order, it may be possible to identify the matter of which the deadline was exceeded or the matter of which the deadline is near.

According to the above configuration, the user can change the processing portion or the processing order to be assigned by a simple operation while listing the matters assigned to each of the processing portions and the processing order thereof. Further, on the device monitoring screen, various information other than the identification information of the printing device 30 or the processing order is displayed. Therefore, the user can make a modification such that the processing order of the desired matter becomes the desired processing order while comparing the medium type or the medium size used in the printing device 30, the required time until the processing of all the matters assigned to the printing device 30 is ended, or the like.

Further, in the present embodiment, since the estimation time until the processing portion such as the printing device 30 becomes available is displayed, the user can easily specify the processing portion that is capable of starting the changed matter at an early stage when the assignment of the matter is changed. Further, in the present embodiment, it is possible to change the assignment to the printing device 30 or the processing order for the matter for which the processing is unexecuted, and it is not possible to change the matter that is being processed. Therefore, the complicated work such as interrupting the processing of the matter being processed to change the processing order or restarting after the interruption can be prevented.

The information that may be changed depending on the operation status of the production system 1 is also displayed on the device monitoring screen according to the present embodiment. Various types of information can be adopted as such information, and one of the information may be an alert related to the deadline. That is, even on the device monitoring screen, the display portion 20a2 displays the alert in association with the process of which the deadline was exceeded or the process of which the deadline is about to be exceeded. The process is the same as the process which is a display target of the alert on the group management screen. Therefore, when the display portion 20a2 specifies the process of which the deadline was exceeded or the process of which the deadline is about to be exceeded, the display portion 20a2 displays the alert in association with the process even on the device monitoring screen. In the example illustrated in FIG. 8, in association with the matter 1 having the earliest processing order assigned to the printing device 1, an icon $I_7$ is displayed indicating that the deadline was exceeded or the deadline is about to be exceeded.

The information related to the status of each processing portion is also displayed on the device monitoring screen according to the present embodiment. Various information can be adopted as such information, but in the present embodiment, the display portion 20a2 displays the information corresponding to the remaining amount of materials used in the processing portion as one of the information. For example, when the processing portion is the printing device 30, the materials used in the processing portion include a recording material such as ink, medium, and the like. In the present embodiment, regarding these materials, a material shortage alert is output.

In order to acquire the information indicating the remaining amount of materials, in the present embodiment, the processing portion such as the printing device 30 is provided with the remaining amount sensor of the material to be used and can output the information indicating the remaining amount of materials in response to the request from the server 10. When the device that is connected to the server 10 is not used as in the packing process in the present embodiment, the remaining amount of materials to be used may be configured such that, for example, the remaining amount or a code that indicates the remaining amount may be read by the barcode reader 60 and transmitted to the server 10. In any case, the information indicating the remaining amount of materials is recorded in the non-volatile memory 10c in association with the identification information of the processing portion. When a plurality of materials are used, the remaining amount is recorded for each material.

The display portion 20a2 performs a transmission request of the information, which indicates the remaining amount of materials used in the processing portion displayed on the device monitoring screen, on the server 10. When the remaining amount of materials is equal to or less than a threshold value, that is, the remaining amount of materials is the remaining amount in which the material shortage alert is to be output, the server 10 transmits the information indicating the remaining amount of materials in association with the identification information of the processing portion. The display portion 20a2 acquires the information indicating the remaining amount of materials via the communication portion 20b. When the information is acquired, the display portion 20a2 specifies the processing portion based on the identification information associated with the information and specifies the matter assigned to the processing portion by referring to the process management data 10c3. Further, the display portion 20a2 specifies the amount of materials required to complete the production of each matter based on the number of productions remaining in the matter being processed and the number of productions associated with the matter waiting to be processed. The required amount of material may be defined in various modes, and for example, a configuration such as multiplying the number of productions by an average value of the materials consumed when producing the number of unit productions can be adopted. Of course, depending on the mode of the finished product (for example, depending on an image to be printed), the required amount of materials may be estimated.

When the required amount of materials is specified, the display portion 20a2 determines whether or not the required amount of materials is larger than the remaining amount of materials. When the required amount of materials is larger than the remaining amount of materials, the display portion 20a2 specifies the matter that cannot be processed with the remaining amount of materials and displays the icon indicating an alert in association with the matter. The icon may be in various modes as long as the icon can warn of a shortage of material, but it is preferable that the shortage of material is indicated. In the example illustrated in FIG. 8, an alert is displayed by displaying the frame $F_{51}$ indicating the matter 16 which is the last processing order of the printing device 5 in dark gray, and further, the icon $I_8$ indicating a shortage of C (cyan) ink is displayed in the frame $F_{51}$.

On the device monitoring screen illustrated in FIG. 8, the medium type used in the printing device 30, the medium size used in the processing of each matter, or the medium type are displayed for each printing device 30. Therefore, on the device monitoring screen, whether or not the same material as the material used for the print processing corresponding to the matter to be moved is used in the printing device 30, which is a movement destination, is displayed in association with the processing portion. According to this configuration, when the user performs an operation on the matter by operating the input portion 20e, the user can recognize the medium type used in the printing device 30 which may be a movement destination. Further, the user can recognize the medium size or the medium type used in the processing of each matter.

The display of such a material is not limited to the display of the printing device 30, and the same display may be performed for any processing portion. That is, regarding any processing portion, a configuration may be adopted in which whether or not the same material as the material used for the processing corresponding to the matter to be moved is used, is displayed in association with the processing portion.

3. Process Management Processing

Figure 9:
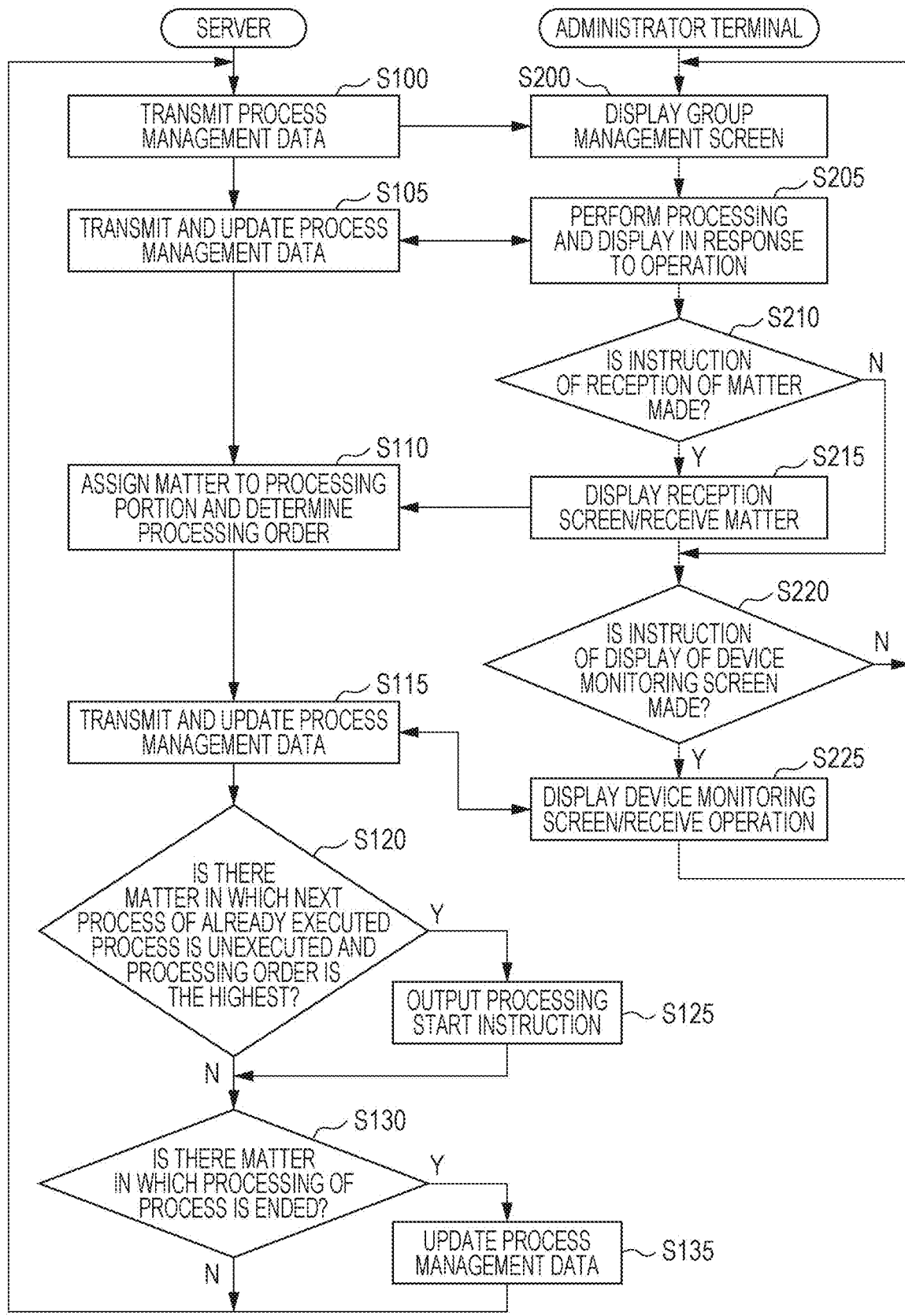
FIG. 9 is a diagram illustrating a sequence when a process management is performed.

Next, a sequence in case of the process management accompanied by the above screen display will be described. FIG. 9 is a sequence diagram mainly illustrating the cooperation between the server 10 and the administrator terminal 20. When the production system 1 is in an operation, a program for the process management is executed in each of the server 10 and the administrator terminal 20. When the processing portion, which is a display target, is specified in the administrator terminal 20, the sequence illustrated in FIG. 9 is started. When the sequence is started, the processor 10a of the administrator terminal 20 displays the group management screen on the display 20d by using the function of the display portion 20a2 (step S200). At this time, the display portion 20a2 performs the transmission request of the process management data 10c3 with respect to the server 10, and the processor 10a of the server 10 transmits the process management data 10c3 required for the screen display to the administrator terminal 20 in response to the transmission request. The display portion 20a2 displays, for example, the group management screen as illustrated in FIG. 6 based on the transmitted process management data 10c3.

When the group management screen is displayed, the processor 20a performs the processing and the display in response to the user's operation (step S205). At this time, the processor 10a transmits the process management data 10c3 in response to the request from the processor 20a and updates the process management data 10c3 in response to the user's operation (step S105). The user's operation may be various operations. For example, on the group management screen, when the user performs an operation that indicates the output instruction of the recovery plan in a situation in which the alert related to the deadline of the process is displayed, the presentation portion 20a3 displays the recovery plan as illustrated in FIG. 7. Further, when the user performs an operation of the instruction of the start of the print setting by the input portion 20e, the display portion 20a2 displays a screen for the print setting and receives the print setting by using the preset data 10c2 or the like. These operations and displays are exemplary, and the processor 20a performs the processing and the display in response to any operation.

In a state in which the group management screen is displayed, the user can perform the operation of the instruction of the reception of a new matter by the input portion 20e, and the processor 20a determines whether or not the instruction of the reception of the new matter is made (step S210). In step S210, when it is determined that the instruction of the reception of the new matter is made, the display portion 20a2 displays a reception screen of the matter as illustrated in FIG. 5 on the display 20d based on the process management data 10c3. Further, the reception portion 20a1 receives an input of the matter using the reception screen (step S215).

When an instruction of the addition of the matter, which is input by the user by using the reception screen, is made, the display portion 20a2 returns to the display on the group management screen, and the reception portion 20a1 transmits information indicating the input matter to the server 10. That is, the information that indicates the identification information of the matter included in the group, the number of deliveries, or the like is transmitted to the server. The processor 10a adds the transmitted information to the process management data 10c3. Further, the processor 10a assigns each process of the new matter to the processing portion by using the function of the assignment portion 10a2 (step S110). At this time, the assignment portion 10a2 determines the processing order of the matter based on the priority level of the matter. The information indicating the assignment result and the processing order is added to the process management data 10c3, and the process management data 10c3 is updated. In step S210, when it is determined that the instruction of the reception of the new matter is not made, step S215 is skipped.

Further, in a state in which the group management screen is displayed, the user can perform the operation of the instruction of the display of the device monitoring screen by the input portion 20e, and the processor 20a determines whether or not the instruction of the display of the device monitoring screen is made (step S220). In step S220, when it is determined that the instruction of the display of the device monitoring screen is made, the display portion 20a2 displays the device monitoring screen on the display 20d based on the process management data 10c3. Further, the reception portion 20a1 receives an input of the operation using the device monitoring screen (step S225). When the instruction of the display of the device monitoring screen is made, the user can make an instruction for a device that is related to the processing portion of the process, and the display portion 20a2 displays the device monitoring screen of the instructed device. For example, when the instruction is made for the printing device that executes the printing process, the device monitoring screen related to the printing device as illustrated in FIG. 8 is displayed.

In a state in which the device monitoring screen is displayed, the operation portion 20a4 is capable of receiving various operations. For example, when the movement of the matter is received, the operation portion 20a4 performs an instruction of deleting the assignment and processing order before the movement in the moved matter, reassigning to the processing portion corresponding to the position after the movement, and updating the process management data 10c3 such that the processing order corresponding to the position is added. As a result, the processor 10a updates the process management data 10c3 such that the instructed information is added (step S115). In step S220, when it is determined that the instruction of the display of the device monitoring screen is not made, step S225 is skipped.

As described above, the processor 10a of the server 10 also functions as the production portion 10a1 in a situation in which the display of various screens or operation inputs is performed on the administrator terminal 20. Specifically, the production portion 10a1 determines whether or not there is the matter in which the next process of the already executed process is unexecuted and the processing order is the highest (step S120). That is, in order to produce the finished product of each matter, it is necessary to execute the plurality of processes, and the processing of the next process cannot be started unless the processing of the previous process is completed. For example, in the example illustrated in FIG. 8, the matter 15 of the printing device 6 has the highest processing order, but the printing process cannot be started unless the process before the printing process by the printing device 6, for example, the print setting process is completed.

The production portion 10a1 acquires the matter assigned to each processing portion and the processing order of the matter based on the process management data 10c3. Further, the production portion 10a1 acquires the matter having the highest processing order in each processing portion. Thereafter, the production portion 10a1 acquires the matter in which the immediately preceding process is completed although the process in the processing portion is not started among the matters having the highest processing order. When there is such a matter, the production portion 10a1 determines that there is a matter in which the next process of the already executed process is unexecuted and the processing order is the highest.

In step S120, when it is determined that there is a matter in which the next process of the already executed process is unexecuted and the processing order is the highest, the production portion 10a1 outputs the instruction for starting the processing of the matter to the processing portion (step S125). In this case, the production portion 10a1 adds the information indicating that the processing of the matter is already started to the process management data 10c3. In step S120, when it is determined that there is no matter in which the next process of the already executed process is unexecuted and the processing order is the highest, the production portion 10a1 skips step S125. Regarding the first process in which there can be no already executed process, such as immediately after the start of operation of the production system 1, in step S120, the instruction of the start of the processing is made by step S125 for the matter having the highest processing order without considering the presence of the already executed process.

Further, the production portion 10a1 determines whether or not there is a matter in which the processing of the process is ended (step S130). In the present embodiment, when the process for each matter in the processing portion is ended, the processing portion transmits the information indicating the end of the process to the server 10. The production portion 10a1 receives the information indicating the end of the process but considers the matter, in which the information is not reflected in the process management data 10c3, as a matter in which, the processing of the process is ended.

In step S130, when it is determined that there is a matter in which the processing of the process is ended, the production portion 10a1 adds the information indicating that the processing of the matter is ended to the process management data 10c3 and updates the process management data 10c3 (step S135). In step S130, when it is determined that there is no matter in which the processing of the process is ended, step S135 is skipped. When step S135 is executed or step S135 is skipped by the determination of step S130, the processor 10a of the server 10 repeats the processing after step S100. On the other hand, in step S220 of the administrator terminal 20, when it is determined that the display instruction on the device monitoring screen is not made, step S225 is skipped. When step S225 is executed or step S225 is skipped by the determination of step S220, the processor 20a of the administrator terminal 20 repeats the processing after step S200.

4. Other Embodiments

The above embodiment is an example for executing the present disclosure, and various other embodiments can be adopted. For example, in the above-described embodiment, the server 10 and the administrator terminal 20 are configured with different devices, but both may be the same device or may be distributed to three or more devices. Further, the processing orders of the sequences illustrated in FIG. 9 may be different. For example, steps S130 and S135 may be executed before steps S120 and S125. Further, for example, steps S220 and S225 may be executed before steps S210 and S215. Of course, in this case, the order of the corresponding processing on the server 10 also changes.

Further, the display mode of the screen that functions as a user interface is not limited to the mode as in the above-described embodiment. For example, the information displayed and the information that can be displayed may be more or less. FIGS. 10 to 12 illustrate an example of a screen in a mode for performing a simpler display. A configuration for displaying these screens can be achieved with the same configuration as that illustrated in FIGS. 1 to 4 described above. However, when there is the information that does not need to be displayed as the displayed content is simplified, the acquisition of that information may be omitted.

FIG. 10 is an example of the reception screen of the matter. Some information, which is displayed on the reception screen illustrated in FIG. 5, is not displayed on the reception screen in FIG. 10. For example, the medium name, the information related to the process, the icon indicating the preview of the matter, and the like are not displayed. Even with such a configuration, it is possible to associate a plurality of matters with a group. Of course, in a configuration in which various types of information are not displayed, a configuration that is displayed according to the user's instruction may be used. Further, the information that is not displayed on the reception screen illustrated in FIG. 5 may be displayed on the reception screen illustrated in FIG. 10. The information is displayed at any position on each screen, for example, in the example illustrated in FIG. 10, it is configured such that the information indicating the priority level and the delivery date can be designated below the requester name in the rectangle on the left side of the screen.

FIG. 11 is an example of the group management screen. Some information, which is displayed on the group management screen illustrated in FIG. 6, is not displayed on the group management screen in FIG. 11. For example, an icon indicating a worker, an icon indicating an already executed matter, an icon indicating an unexecuted matter, an icon indicating a preview of a matter, and the like are not displayed. Further, the information that is not displayed on the reception screen illustrated in FIG. 6 may be displayed on the group management screen illustrated in FIG. 11. Also in the group management screen illustrated in FIG. 11, the circular icon $I_2$ colored in black is an icon indicating that the processing is being executed, and the icon moves from the left toward the right side according to the progress of the process. Even with this configuration, the user can list the progress of the process of the matter for each group and is able to ascertain the progress of the process based on the displayed contents. Therefore, it is possible to reduce the burden of the process management by the user.

FIG. 12 is an example of the device monitoring screen. Some information, which is displayed on the device monitoring screen illustrated in FIG. 8, is not displayed on the device monitoring screen in FIG. 12. For example, the medium type or the medium size being used, the estimation time until the printing device 30 becomes available, and the like are not displayed. Further, the information that is not displayed on the reception screen illustrated in FIG. 8 may be displayed on the device monitoring screen illustrated in FIG. 12. The number of print copies is displayed for each matter on the device monitoring screen illustrated in FIG. 12. Even with this configuration, each matter is displayed in association with the printing device 30 that performs printing for each matter. Further, each matter is displayed in the processing order. Further, the processing order of the matter or the assigned printing device 30 can be changed by the operation of moving each matter. Therefore, the user is able to easily change the processing order of the matter and the printing device 30 that performs the processing of the matter, on the device monitoring screen.

A matter is a unit, which is a target for the processing in the plurality of processes, and when the process corresponding to the matter is completed, a finished product corresponding to the matter is produced. Therefore, a matter is, for example, a unit of an instruction for obtaining a predetermined finished product by executing processing from the start to the end of one or more processes. The number of finished products to be completed in one matter is not limited and may be one or a plurality. The finished product of each matter may be an article in a predetermined state, and of course, another finished product may be completed through a process using the finished products produced by the plurality of matters.

A group is a unit including a plurality of matters and may be defined such that the plurality of matters belonging to the same group form a group having a specific meaning. Therefore, various configurations can be adopted in addition to the configuration defined such that the matters having the same delivery date and the same requester belong to the same group. For example, a set of a plurality of matters may be given a name, and a plurality of matters having the same name may belong to the same group. Further, the matters having the same delivery destination of the finished product, the type of the finished product, the type of the matter, the processing portion, the type of the process, and the number of processes may belong to the same group.

In the list in which a plurality of matters are displayed in a distinguishable manner for each group, the matters belonging to each group can be identified, and each group may be displayed in a distinguishable manner. Various modes can be adopted as the mode of displaying such a list. For example, it may be configured such that the colors, icons, and display positions of a plurality of matters belonging to the same group are made in common and are made to be distinguishable from a plurality of matters belonging to different groups. Further, a configuration or the like may be used in which a plurality of matters belonging to the group are associated with a name or icon indicating the group in a dendrogram and displayed.

The process corresponding to the matter is a work corresponding to at least a part of the processing required to complete the matter and may be different or the same for each matter. In the production process, it is only necessary to be able to execute the processing of the process corresponding to the matter. The processing may be executed by the device, may be executed by the worker, and may be executed by both the device and the worker. When the processing is executed by the device, the start instruction of the processing or the information required for the processing is electrically provided thereby the processing is executed. When the processing is executed by the worker, the start instruction of the processing or the procedure required for the processing is sent to the worker thereby the processing is executed. Of course, the finished product to be produced is not limited to print material, and a production system for various finished products may be achieved. That is, it may be a production system that does not include the print processing in the processing.

Further, the processing portion, which is executed by the worker, notifies the server of the start and the end of the processing by using the barcode and the barcode reader, but the present disclosure is not limited to this. The server may be notified of the start and the end of the processing by using an IC tag and an IC tag reader, or by using other devices such as imaging objects to be processed with a digital camera. Further, when processing a plurality of target objects, the server may be notified of the start or the end for each target object with any number.

The progress of the process may indicate the degree of progress of the process, for example, it may be represented by the information indicating that each process is started, the information indicating that each process is ended, the information indicating a ratio at which the process progresses, or the like. The mode for displaying the progress of each process in the list is not limited to the above-mentioned mode and may be configured to indicate the degree of progress numerically.

A first direction in which the matters are arranged and a second direction in which the processes are arranged in the processing order may be different from the above-described embodiment. For example, the first direction may be the horizontal direction and the second direction may be the vertical direction. Further, the direction in which the time proceeds may also be different from the above-described embodiment.

The priority level may be any information indicating whether or not the processing order of the process corresponding to the matter is to be prior to other matters, and it suffices when the priority levels are relatively determined among the matters. Of course, the priority level is not limited to the configuration having two stages as in the above-described embodiment, and the priority level may be set in more stages. The processing of the matter of which the priority level is high may be started with priority over the processing of the matter of which the priority level is low, and it is also possible to interrupt the process being processed and start the processing of the matter having a high priority level. When there is a plurality of matters of which the priority level is relatively high, it is possible to adopt a configuration that starts the processing in the order according to predetermined rules, for example, according to the order in which the requests for the matters are earlier or the order in which the delivery date is earlier.

The deadline corresponding to the matter is a point on the time axis where the processing is to be ended in order to produce the finished product according to the matter and may be designated in various units. Therefore, the configuration is not limited to the configuration designated by the date as in the above-described embodiment, and the deadline may be designated in units of hours or minutes. Further, the determination as to whether or not the deadline meets may be made according to various rules. For example, when the deadline is designated in units of date, the last time of the day (24:00) may be regarded as the deadline, or the last time of the operating period on that day (for example, 17:00 when the operating period is 9:00 to 17:00) may be regarded as the deadline.

Further, the deadline corresponding to the matter may be defined for each process or may be defined for each matter. Further, there may be a configuration in which a deadline is defined for at least a part of the process, but a deadline may not be defined for the other part. In any case, it suffices when the deadline is defined for the process that requires the processing to be completed within the deadline.

The list of matters, processes, and deadlines may be displayed so that a plurality of matters can be listed in a state in which the process corresponding to each matter and the deadline, which corresponds to the process or the matter, associated with each other, but the list is not limited to the configuration according to the above-described embodiment. For example, the deadline may be represented numerically and may be represented by a bar graph indicating the ratio of the period from the start of the process to the present to the total period in an area where the bar graph of the length corresponding to the period from the start of the process to the end of the deadline can be displayed. Further, a warning may be displayed such that the shorter the remaining period from the present to the end of the deadline, the stronger the intensity.

It suffices that whether or not the deadline is about to be exceeded indicates whether or not there is a risk of exceeding the deadline, for example, it may be determined that the deadline approaches when the remaining period until the deadline is equal to or less than a default value, or it may be determined whether or not the deadline approaches depending on the processing and progress of the process. As the latter, for example, when the deadline was exceeded when the processing of the process is executed at a default processing speed, a configuration, in which it is determined that the deadline approaches, can be adopted.

The recovery plan may be an example of processing required in the period from the current date and time to the deadline so that the deadline is not exceeded. That is, it may be an example of processing required to be such that the processing speed of the process becomes a speed that does not exceed the deadline. As described above, such a recovery plan may be in various modes other than the recovery plan for increasing the number of processing portions for performing the processing of the process. For example, it may be a recovery plan including an increase in the number of workers or an extension of working hours.

When displaying the unexecuted process, the already executed process, and the non-execute process for each matter so as to be distinguishable from each other, the display may be made such that the user can ascertain the progress of each process and the presence or absence of the process. The mode of display for making each process distinguishable is not limited to the mode as in the above-described embodiment and may be various modes. For example, it is possible to adopt a configuration in which unexecuted, already executed, and not-to-be-executed processes are displayed in a distinguishable manner by characters, colors, and various icons. Further, the process, which is being executed, may be displayed in a distinguishable manner.

Further, the configuration for displaying the unexecuted process, the already executed process, and the non-execute process in a distinguishable manner for each matter is not limited to the above-mentioned configuration. For example, in the above-described embodiment, a configuration may be used where the display portion 20a2 displays the process for which the processing is unexecuted and the process for which the processing is already executed with similar marks in a distinguishable manner, and displays the process for which the processing is not to be executed with a mark that is dissimilar to the above similar marks. The similar marks can be represented in various modes. For example, a mark having a different color but having the same or similar shape is regarded as a similar mark, and a mark having a shape that is neither the same nor similar is regarded as dissimilar. Further to this, there is a configuration in which marks that are enlarged or reduced from a certain mark are considered to be similar, while marks that do not superimpose even when enlarged or reduced are considered to be dissimilar.

The worker of the process may be a person who performs the processing of the process or may be a person who performs the work related to the device for performing the processing of the process. For example, when the processing of the cutting process or laminating process is performed by operating the cutting device and laminating device by a person, the person who performs the operation becomes the worker. When the printing device, the cutting device, or the laminating device can automatically perform the processing of the cutting process or laminating process, the person who performs an operation, maintenance, or the like of the printing device, cutting device, or laminating device, becomes the worker. Further, there may be a process in which no worker is present, such as when the degree of automation by the device is high.

The assignment of the matter to the processing portion is established by at least associating the matter with the processing portion in which the matter is to be processed. When the assignment is performed, the processing order of the matter may be determined. When the reassignment is performed for the matter, the processing order in the processing portion after the assignment may be modified.

Further, the present disclosure is also applicable as a program or method executed by a computer. Further, the system, the program, or the method as described above may be achieved as a single device, may be achieved by using components provided by a plurality of devices, and includes various modes. Further, a part of the system, the program, or the method can be changed as appropriate, and a part thereof is software and a part thereof is hardware. Further, the disclosure is also established as a recording medium for a program that controls a system. Of course, the recording medium of the program may be a magnetic recording medium or a semiconductor memory, and any recording medium developed in the future can be considered in exactly the same way.

Further, the above-mentioned embodiment does not limit the disclosure. Since the embodiment includes a plurality of disclosures having different effects, one problem or effect that can be read from the embodiment is not necessarily a problem or effect for all the disclosures included in the embodiment.

What is claimed is:

1. A production method comprising:
   receiving a plurality of matters and deadlines for the received matters, respectively, the deadlines including at least one of a deadline date and a deadline time for each of the received matters;
   displaying a list of the received matters, a plurality of processes corresponding to the received matters, and the deadlines for the received matters; and
   producing a finished product by executing processing that includes the plurality of processes corresponding to the received matters.

2. The production method according to claim 1, wherein the displaying includes displaying at least one of a process whose deadline was exceeded and a process whose deadline is about to be exceeded in a distinguishable manner.

3. The production method according to claim 1, further comprising:
   presenting an automatically created recovery plan for at least one of a process whose deadline was exceeded and a process whose deadline is about to be exceeded.

4. The production method according to claim 3, wherein the presenting includes presenting the recovery plan which is automatically created based on the deadline and at least one of a current date and a current time.

5. A production system comprising:
   at least one processor
      configured to receive a plurality of matters and deadlines for the received matters, respectively, the deadlines including at least one of a deadline date and a deadline time for each of the received matters;
      configured to display a list of the received matters, a plurality of processes corresponding to the received matters, and the deadlines for the received matters; and
      configured to produce a finished product by executing processing that includes the plurality of processes corresponding to the received matters.

6. A non-transitory computer-readable storage medium storing a production program for causing a computer to execute:
   receiving a plurality of matters and deadlines for the received matters, respectively, the deadlines including at least one of a deadline date and a deadline time for each of the received matters;
   displaying a list of the received matters, a plurality of processes corresponding to the received matters, and the deadlines for the received matters; and
   producing a finished product by executing processing that includes the plurality of processes corresponding to the received matters.

* * * * *